United States Patent [19]

Eberhard et al.

[11] Patent Number: 5,758,144
[45] Date of Patent: May 26, 1998

[54] DATABASE EXECUTION COST AND SYSTEM PERFORMANCE ESTIMATOR

[75] Inventors: Rainer Eberhard; Harold Hall; Seetha Lakshmi, all of San Jose, Calif.

[73] Assignee: International Business Machines Corporation, Armonk, N.Y.

[21] Appl. No.: 265,595

[22] Filed: Jun. 24, 1994

[51] Int. Cl.$^6$ ........................................... G06F 17/30
[52] U.S. Cl. ..................................... 395/602; 395/616
[58] Field of Search ........................... 395/600, 425, 395/650, 601, 602, 616

[56] References Cited

U.S. PATENT DOCUMENTS

| | | | |
|---|---|---|---|
| 4,829,427 | 5/1989 | Green | 395/600 |
| 4,956,774 | 9/1990 | Shibamiya et al. | 395/600 |
| 5,043,872 | 8/1991 | Cheng et al. | 395/600 |
| 5,091,852 | 2/1992 | Tsuchida et al. | 395/600 |
| 5,301,317 | 4/1994 | Lohman et al. | 395/600 |
| 5,325,525 | 6/1994 | Shan et al. | 395/650 |
| 5,412,806 | 5/1995 | Du et al. | 395/610 |

OTHER PUBLICATIONS

Duppel, N., "Modeling and Optimization of Complex Queries in a Shared-Nothing System", IEEE, pp. 52-59, Jan. 1991.

"Crystal Product Family Demonstration", BGS Systems, Inc. (printout of a slide show provided by the applicant with PTO 1949) Dec. 1491.

IBM Database 2 Version 2 SOl Reference Release 2, 1989, Chapter 6, "Statements", pp. 95-246.

IBM Database2 Version 2 SOL Reference Release 2, 1989, Chapter 5, "Queries", pp. 83-94.

Appendix C of IBM Database2 Version 2 Release 1, Application Programming Guide, 1988.

IBM Database2 Version 2 Administration Guide vol. 1, Release 2, Sep. 1989, pp. 2-24 to 2-28.

"DB2 Cost Formula", Shibamiya, A., Yeung, M.Y., IBM Technical Disclosure Bulletin, vol. 34, No. 12, May 1992, pp. 389-394.

Computer Performance Modeling Handbook, Lavenberg, Stephen S., Academics Press, 1983, chapter 3 (p. 94).

BGS Systems, DB2 Support Facility Demo Oct. 1992.

BGS Systems, Crystal Products Demo Jan. 1992.

Primary Examiner—Thomas G. Black
Assistant Examiner—Jack M. Choules
Attorney, Agent, or Firm—Marilyn Smith Dawkins

[57] ABSTRACT

The software tool of this invention estimates the costs of an application program accessing a database. These costs may be execution costs of the application or of a transaction, SQL statement, and/or a utility. Execution costs include CPU time, I/O time and minimum elapsed time. For estimating the execution costs, the tool receives simplified and partial definitions of tables, utilities, SQL statements, transactions, and applications. The estimator tool requires only a minimal amount of information to calculate the various execution costs.

1 Claim, 24 Drawing Sheets

IBM DB2 Estimator -- MVS Utilities Specification

File  Edit  Costs  Help

Project File: IPLAW  This project contains samples for IPLAW → 5/26/94 3:0
Sub-Project: EXAMPLES  This Subproject contains examples for IPLAW → 5/26/94 3:05:21
Utility File: STOCKIC  This is a full image copy of the STOCK table → 5/27/94 11:32:10

Utility
IMAGE COPY
401 — ○ Incremental
402 — ⦿ Full
403 — ○ LOAD
404 — ○ REORG
405 — ○ RUNSTATS Description: Holds Info on current STOCK → 5
Table Name: STOCK
406
Total Rows in Table:
100,000
% Pages Updated:
30 — 407

Clear
Reset
Save
Cancel
ASUtilDef

COPY TABLESPACE STOCK ALL FULL YES SHRLEVEL REFFRENCE

FIG. 4

SImate -- Indexed Access Details

Index Name    PRIME

Rows in table 100,000         4K Leaf Pages 226
                              Index Levels 2
                              Entries per page 444.

625 — Index FF          | 0.00001 |
610 — Entries Looked At | 1       |           Pages Touched | 2 | — 620
626 — Non-Matching FF   | 1.      |           Miss Ratio    | 0.|
611 — Result Rows/Entries | 1     |           Pages Read    | 0 | — 621

Table Name STOCK
Rows in Tablespace 100,000    Pages in Table 3,033
                              Rows/Page 33

Stage 1 Filter Factor | 1. |                  Cluster Factor | 0.030303   | — 624
612 — Rows Looked At  | 1  |                  GETPAGES       | 33         | — 622
Stage 2 Filter Factor | 1. |                  Miss Ratio     | 0.51515151 5| 
613 — Rows Returned   | 1  |                  Pages Read     | 17         | — 623

[OK]
[Cancel]
ASInAccess

DATABASE EXECUTION COST AND SYSTEM PERFORMANCE ESTIMATOR

CROSS-REFERENCE TO RELATED APPLICATIONS

Ser. No. 08/265,344 pending concurrently herewith on Jun. 24, 1994, for a "Apparatus and Method for Estimating the Time to Execute SQL statements, Transactions and Utilities Based Upon CPU and I/O Time Estimates," currently co-pending, and assigned to the same assignee as the present invention.

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to software application development tools and system management tools, and more particularly relates to a system, method and tool for estimating the execution costs of an application designed to access a database, and for estimating the system performance when executing the application.

2. Description of the Related Art

In a relational database, information is kept in logical tables comprised of rows and columns. Underlying this logical structure is the physical structure used to hold the data and the indexes used to access the data.

A utility is used to maintain the data in the database. The REORG utility is used for reorganizing the physical data on the disk. It reorganizes a table space to improve access performance and reorganizes indexes so that they are more efficiently clustered. The BACKUP utility is used for making a copy of the data so that the data can be recovered if it is lost such as after a disaster. The COPY utility creates an image copy of a table space or a data set within the table space. There are two types of image copies. A FULL IMAGE COPY is a copy of all pages in a table space or data set. An INCREMENTAL IMAGE COPY is a copy only of pages that have been modified since the last use of the COPY utility. The LOAD utility loads data into one or more tables in a table space or partition. It may also be used to replace the contents of a single partition or an entire table space. The RUNSTATS utility scans a table space or indexes to gather information about utilization of space and efficiency of indexes.

A Structured Query Language (SQL) statement allows a user (an application or an end user) to access the logical data without regard to physical structure. In data access languages that predated SQL, the data access language included directions to the database manager on how to obtain the data. With SQL statements, the data access language indicates only what data is required, and leaves it to the optimizer function of the database manager to figure out how to find the data.

A transaction is made up of one or more SQL statements and any given SQL statement, within the transaction, may be executed any number of times. In an actual transaction, the SQL statements may be interleaved with application logic, and there may be a specific sequence of execution of the SQL statements. Overhead costs, such as thread create, terminate, authorization checking, and commits, are associated with transactions.

An application is made up of transactions interleaved with application logic. All of the transactions contend for the CPU and the I/O resources.

In specifying a full definition of a table in a relational database, such as in the IBM DB2 relational database, the user and/or application must specify the database name; the table space or storage group defined; the table description in terms of column names, their data types, and other associated information such as data length; as specified in *IBM Database 2 Version 2 SQL Reference Release 2*, 1989, Chapter 6, "Statements," pages 95–246, as incorporated herein by reference.

In specifying a full definition of a SQL statement, a user and/or application must specify the columns selected; the tables accessed; the join columns and predicates; all other predicates with specific values and how they are combined, such as through boolean operators; the columns in GROUP BY and ORDER BY clauses; as well as any columns updated, as shown in Chapter 5, "Queries" of the above referenced document, as incorporated herein by reference.

In specifying a full definition of a transaction, the fully defined SQL statements are fully defined in a programming language such as Cobol, C++, etc., as shown in Appendix C of *IBM Database2 Version 2 Release 1, Application Programming Guide*, 1988. The full definition of the transaction is embodied in program source code that includes the fully defined SQL statements as well as the other language statements that make up the program logic and structure.

When a database manager processes an SQL statement on behalf of an application, the database manager will need to use CPU resources and possibly perform I/O operations to return the results of the SQL query back to the requester. For any given SQL statement, this may involve scanning all the rows of the database tables or using an index to directly access the data. The amount of CPU and I/O necessary will vary depending on various factors. Some of these factors are under the control of the requestor (an application or end user) while others are internal to the database manager and out of the control of the requester.

For applications that are designed to access a database, design decisions affecting the logical structure of the table impact how the SQL statement is coded as well as the performance of the SQL statement. Decisions affecting the physical structure of the table do not affect the SQL statement, but still may affect the performance of the application accessing the data.

Developing an application for accessing a database can be a very expensive process. Before incurring the development cost, it is important to know in the early design phase whether the performance of the finally designed application will meet performance requirements. During the development process, it is important to be able to estimate the performance of alternative designs to determine which design is optimal. Also, after an application is in use, it is important to estimate how modifications to the system may affect its performance.

Methods are known (*IBM Database2 Version 2 Administration Guide* Volume 1, Release 2, September 1989, pages 2-24 to 2-28,) for estimating the amount of disk space required to hold a table and indexes based upon the number of rows in the table and the type of data.

Methods are known for estimating the CPU and I/O time for SQL statements. ("DB2 Cost Formula," Shibamiya, A., Yeung, M. Y., *IBM Technical Disclosure Bulletin*, Volume 34, Number 12, May 1992, pages 389–394).

Tools are known to estimate the SQL statement cost. However, these estimates are based on user inputs regarding database internals that the user is unlikely to have any real knowledge of, such as the number of columns used in an internal sort.

Tools are known to estimate the database cost of an existing application which was designed using a specific design methodology. Unless an application has been designed using this methodology, no estimation is possible.

Tools are known to estimate the cost based upon the costs of other, possibly similar, applications that have been measured. This type of tool may not take into account that the database manager may execute two similar SQL statements in different ways. Tools are known that have a graphical user interface (GUI) that allows a user to build complete executable SQL statements and to execute those SQL statements against the database. However, these tools require more input than is necessary for estimating the cost of executing the SQL statement, and are, therefore, more complex.

SUMMARY OF THE INVENTION

It is an object of this invention to provide a tool that can be used to estimate performance of an application, which accesses a relational database, during all phases of the application's life—early design, development, and use and maintenance.

It is a further object of this invention to provide an estimation tool that is independent of the methodology used to design, develop, and maintain an application program.

It is a further object of this invention to query the application developer only for that information that is currently known about the application.

It is a further object of this invention to query the application developer only for that information that is necessary in estimating the execution costs and system performance.

The software tool of this invention estimates the costs of an application program accessing a relational database. These costs may be execution costs of the application or of a transaction, SQL statement, and/or a utility. Execution costs include CPU time, I/O time, and minimum elapsed time. Minimum elapsed time is an estimation of the amount of time that the application, transaction, SQL statement or utility will take to execute. It is referred to as a minimum elapsed time because the tool does not account for contentions for resources such as buffers and locks. Also, when costs of SQL statements or transactions are estimated in isolation, contention for CPU and I/O resources are not considered.

The above execution costs may also reflect system performance affected by transactions accessing the database, including batch processing. System performance includes an application's CPU utilization, I/O device utilization, and elapsed time including service and queuing time for CPU and I/O devices.

The software tool has a graphical user interface which allows easy input by the user, easy formulation of query (SQL) statements, easy formulation of database definitions and utility commands, and easy formulation of transaction definitions and application definitions.

For estimating execution costs, the user specifies only a partial definition of those tables, in a database, which the application program will be accessing. From these partial definitions, the user can make selections in the graphical user interface which automatically builds a simplified query statement. The simplified query statement does not contain the expression details of an executable query statement. It contains only that information necessary to calculate the execution cost of the query statement. The estimated cost of executing the query statement against the database is then calculated.

Additionally, the software tool calculates the execution costs of a utility command based upon a simplified definition of the database (which comprises one or more simplified table definitions) and simplified definitions of utility commands. Again, the simplified definitions of the database and the utility command comprise only that information which is necessary for computing the cost of the utility.

For estimating the execution costs of a transaction accessing a database, the tool generates a simplified transaction definition including a predefined simplified query statement definition and a frequency of execution of the query statement in the transaction. The transaction definition also includes that information which is necessary to define CPU and I/O costs for non-transaction related program logic, and transaction overhead costs. The execution costs of a transaction is computed based on the costs of the query statement within the transaction, the frequency of execution and the overhead costs.

For estimating the system performance of an application accessing a database, the tool generates a simplified application definition which includes a predefined transaction definition and a frequency of execution of the transaction in the computer system. The application definition includes a predefined simplified transaction definition. The application definition also includes that information necessary to define the system load from external sources, i.e. other than from the predefined transaction. An estimation of the system performance is then calculated based upon the application definition.

DESCRIPTION OF THE DRAWINGS

FIG. 2B shows a graphical user interface of the tool of this invention for receiving a simplified and partial definition of a table by specifying information pertaining to indexes.

FIG. 2C shows a simplified and partial definition of a table generated by the tool based on the input received through FIG. 2A and FIG. 2B.

FIG. 4 shows a graphical user interface of the tool of this invention for receiving a simplified definition of a utility.

FIG. 6B shows a graphical user interface for specifying information related to the access method chosen for a given table within the SQL statement.

FIG. 9 shows a graphical user interface for specifying input for evaluating the performance of the system when at least one application is running; including a simplified application definition including a predefined transaction definition, a frequency of execution of the transaction, and the system load from external sources.

DESCRIPTION OF THE PREFERRED EMBODIMENT

Figure 1:
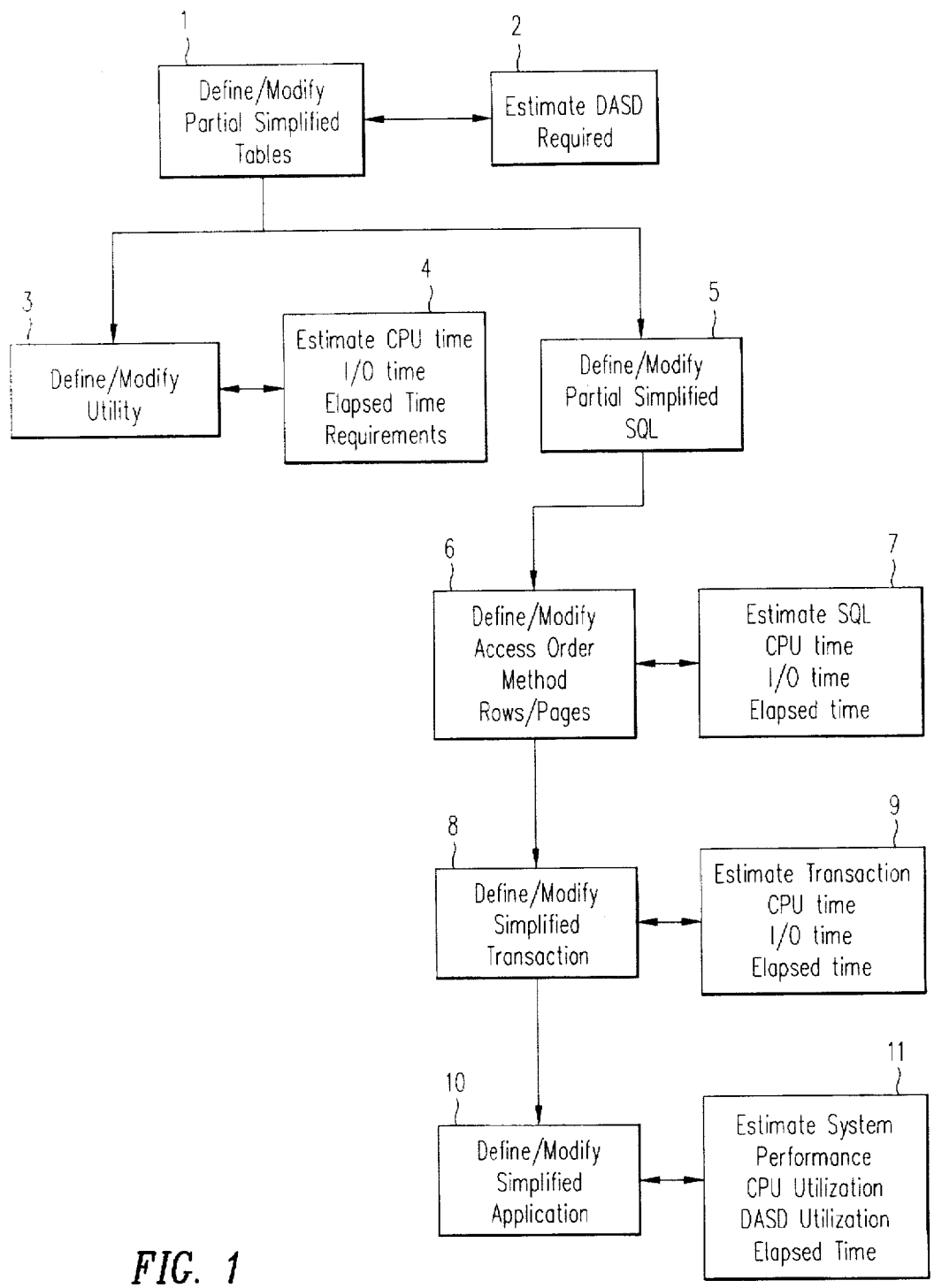
FIG. 1 shows the components of the estimator tool of this invention.

The tool of this invention estimates the performance of database applications such as applications accessing IBM's DB2 database product. This tool estimates the performance of SQL statements, transactions, database utilities and applications. This estimator tool can be used stand-alone in a Windows or OS/2 environment, or integrated with the IBM DataHub/2 product as part of a database system management solution.

In a preferred embodiment, the tool of this invention runs on a IBM personal computer with a 80386SX or upward compatible processor supported by OS/2 Version 2 Release 1, with four megabytes of memory, a hard-disk with 5 MB of unused space, a VGA or VGA compatible display, and an IBM PS/2 or Microsoft compatible mouse. Optional software includes Lotus 1-2-3 for charting the results of the tool's analysis, and IBM DataHub/2 Platform feature for optional invocation of the tool from an OS/2 workstation control point.

The estimator tool provides users with the ability to evaluate the impact of database and application design tradeoffs early in the development cycle. It can easily model database applications and evaluate performance tradeoffs of different design alternatives. The tool provides the user with the ability to specify data at varying levels of detail in order to allow refinement of the data model as the application design progresses; the ability to create objects by merely pointing and clicking; and the ability to estimate the costs of the database portion of the system for capacity planning purposes; the ability to define new types or to modify predefined DASD and CPU types thereby enabling the user to evaluate the impact of hardware changes to the database application.

The estimator tool can assist an application developer in designing and developing efficient SQL statements and tables. The user can identify the SQL statements and transactions and model the tables for a new or changed application, allowing for "what-if" analysis and early performance projections. The estimator tool makes intelligent assumptions about tables, access paths, etc., which the user may accept or override based upon application-specific knowledge. The estimator tool can assist a database administrator in providing a well-designed database environment. The tool's "what-if" analysis capability combined with its performance estimates enables the administrator to make decisions that result in better system utilization. The estimator tool can assist the capacity planner in estimating the resource requirements associated with new applications, changing workloads, and changing resources, such as hardware, table size, and design of indexes. The estimator tool can assist a business analyst in defining the functional specifications of a new or changed database application design. By identifying performance and capacity costs of proposed changes early in the design of key applications, use of the estimator tool can result in reduced application development time and increased developer productivity.

In a multi-user environment, several transactions and SQL statements execute concurrently. These transactions and SQL statements compete with each other for hardware resources such as CPU time, buffer pools, and I/O devices. The estimator tool analyzes the data model defined by the user and combines that with its knowledge of the internal workings of the database to derive its performance estimation. By enabling the user to more accurately estimate the performance of an application, the user can make choices that allow for better system resource utilization.

The estimator tool enables better utilization of systems resources by providing estimates of database applications' CPU and I/O capacity requirements as well as those for individual SQL statements, transactions, and utilities; average elapsed time of SQL, transactions, applications, and utilities; and DASD space requirements at the table level.

The results of the estimator tool's analysis can be viewed online as graphs, tables, text reports, or as files which may be exported to other word processing or spreadsheet applications.

FIG. 1 shows the overall process and components of determining the execution costs of utilities, SQL statements, transactions, and applications. The tool receives input, through a graphical user interface, corresponding to a simplified and partial definition of a table, step 1. In step 2, the tool estimates the amount of storage required to hold the table and the indexes. In step 3, the tool receives input corresponding to a utility type, and it receives input corresponding to a table the utility is to act upon. In step 4, the tool determines the utility execution cost based upon the information obtained from step 1 and step 3. The tool receives input corresponding to a simplified partial definition of a SQL statement, step 5. The tool receives as input, for a given SQL statement, the method by which a relational database manager (e.g., IBM DB2) will access the tables, the sequence in which the tables are accessed when multiple tables are processed, and the number of rows and pages that are processed, step 6. The tool determines the SQL execution cost, step 7, based on the partial definitions of the table(s) and the partial definition of the SQL statement, and knowledge of the internal workings of the database management system. The tool receives a simplified definition of a transaction, step 8, in determining an estimated transaction cost, step 9. The tool has means for receiving as input a simplified application definition, step 10, and estimating the system performance such as CPU utilization, I/O device utilization and elapsed times, step 11. In performing the above estimates, the tool takes the user inputs, and then calls the formulas needed to perform the estimate.

At any step in this process, a user may choose (based upon the estimated results or changes in the design) to return to an earlier step in the process. At the earlier step, the user may modify earlier inputs (such as changing the number of rows in the table), add more detailed inputs (such as specifying specific column names of the table), or modify the design (such as adding an index). The results will reflect, immediately, the changes made in the earlier steps, but the user should continue from the step where the modifications have been made through subsequent steps to see if additional changes may be necessary. For each object the user creates, the user specifies a name and description for that object to be used by the tool in order to reference the object throughout the process.

Figure 2A:
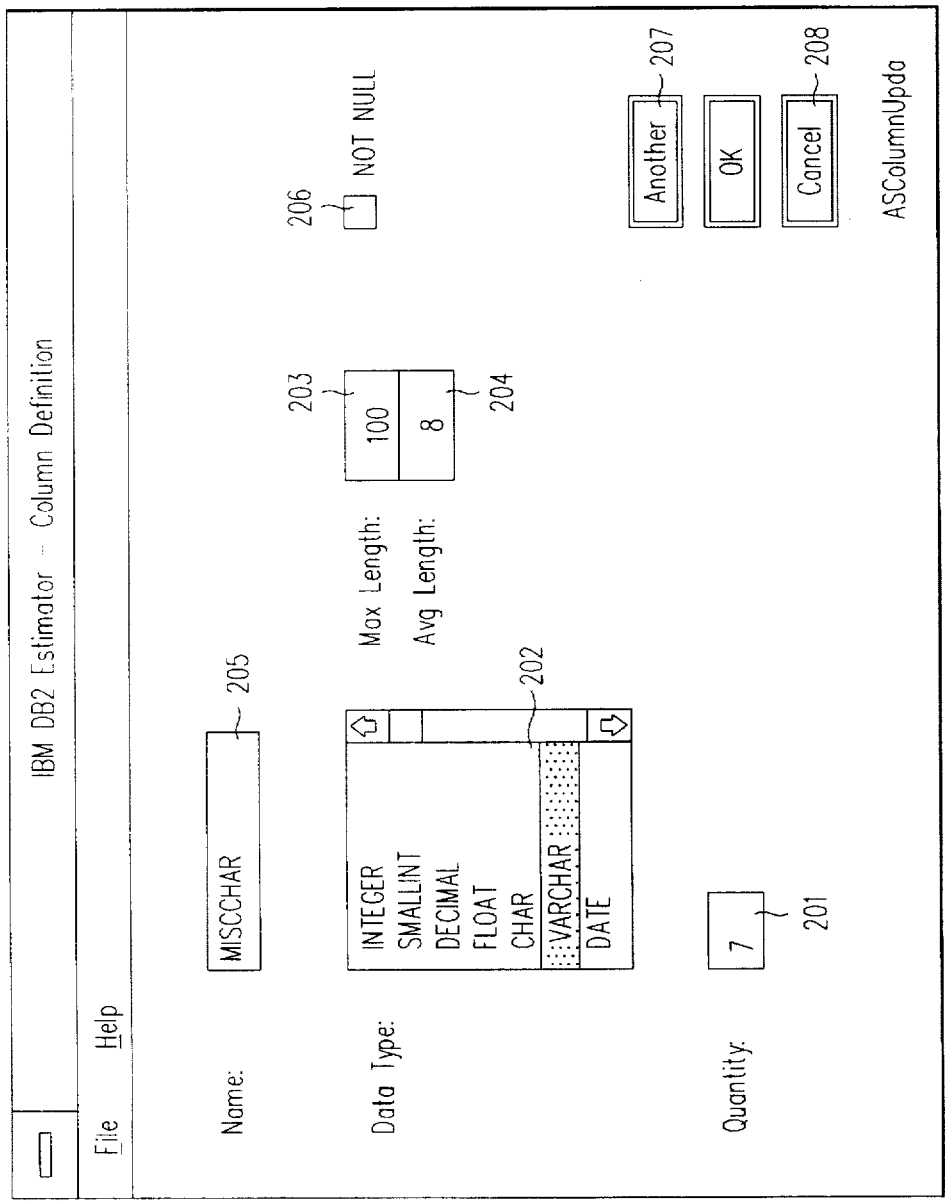
FIG. 2A shows a graphical user interface of the tool of this invention for receiving a simplified and partial definition of a table by specifying information pertaining to the columns in the table.
Figure 2B:
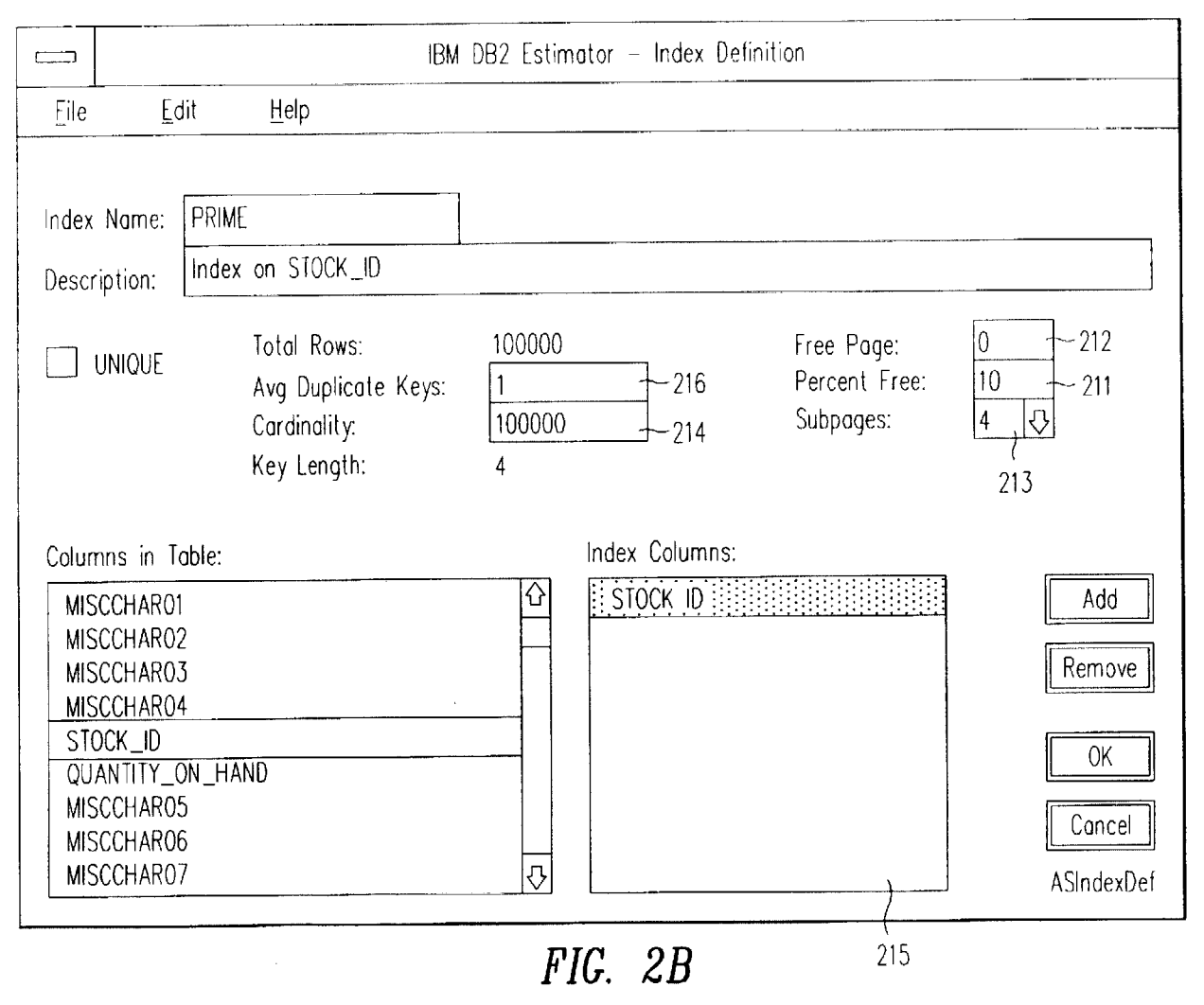
Figure 2C:
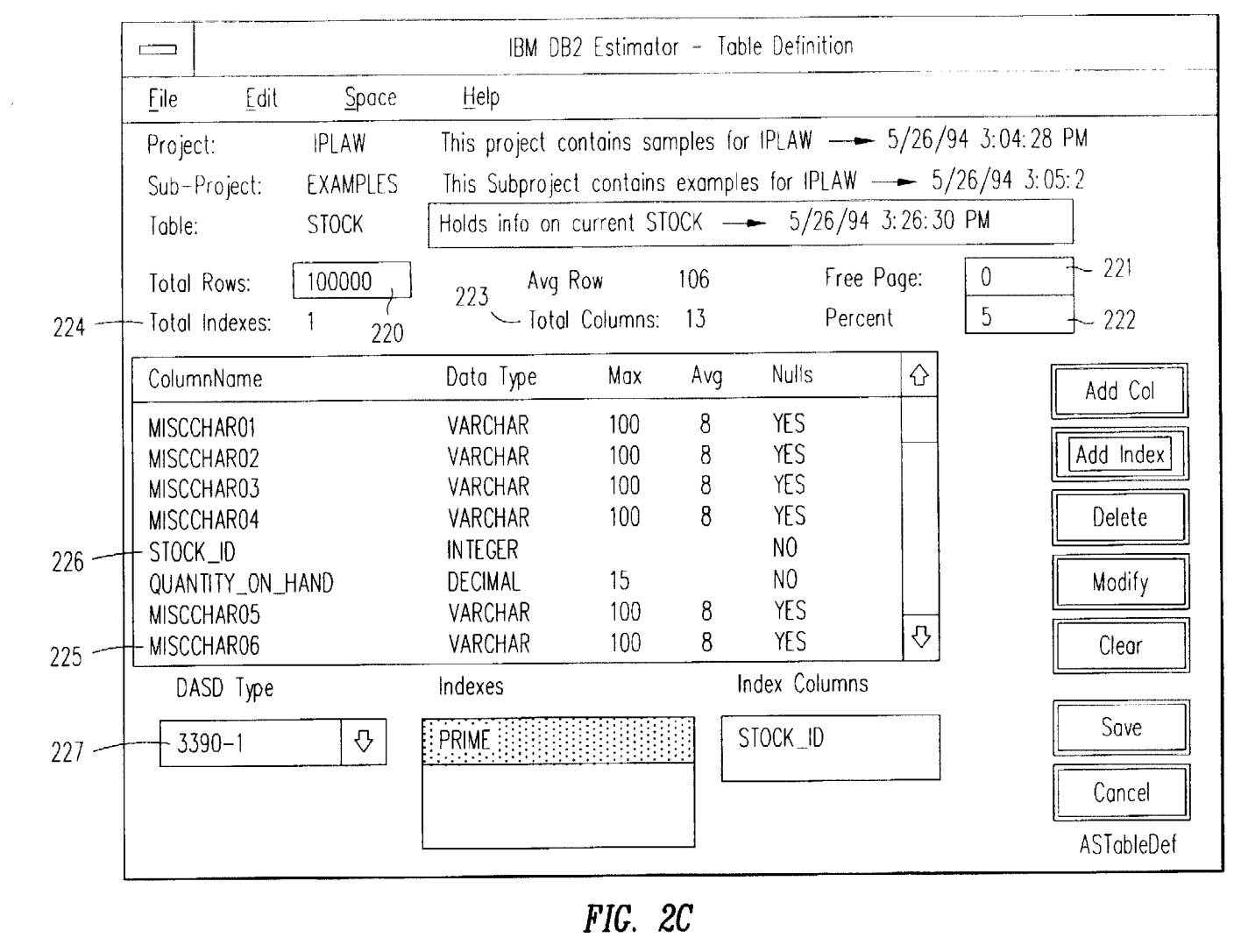

As shown in FIGS. 2A, 2B and 2C, in creating a partial definition of a table, the graphical user interface of the tool allows the user to input some values (such as column name, data type, length and number of such columns, FIG. 2A), and a more complete table definition is created by the tool, FIG. 2C, by filling in some reasonable defaults which can be changed by the user, if necessary. For example, In FIG. 2A, the tool defaults a column name 205 if not otherwise specified. In FIG. 2B, the tool provides a default for free page 212 as zero, percent free 211 as ten, and subpages 213 as four, and average duplicate keys 216 as one. The tool does not require those details not necessary for estimating the DASD space or execution cost of the SQL statement, transactions, or applications.

In FIG. 2A, for a given table, the user specifies, for each column, an optional column name 205, the data type 202 (integer, small integer, decimal, character, variable character, float, date, time, timestamp), whether or not nulls 206 are allowed, and the number of similar columns 201 in the table (with a default to 1). For the data types decimal, character, variable character and float, the user should specify the length 203 of each of these columns. If all columns of the same data type have the same length, this length is entered. If they have different lengths, the columns can be individually entered or an average length 204 of the columns can be entered. For the variable character field, the maximum length 203 should be specified and the average length 204 of the column when the table is filled with data. To define more columns, the user selects the "another" 207 button.

In FIG. 2B, for a given table, the tool receives as input the index definitions of the table. More specifically, the user selects the columns that the index is based upon 215, specifies the percent free space to be left on each page 211, specifies the number of pages before a completely empty page is left 212, specifies the number of subpages within a 4K page 213, and specifies the cardinality of the index 214.

Figure 3A:
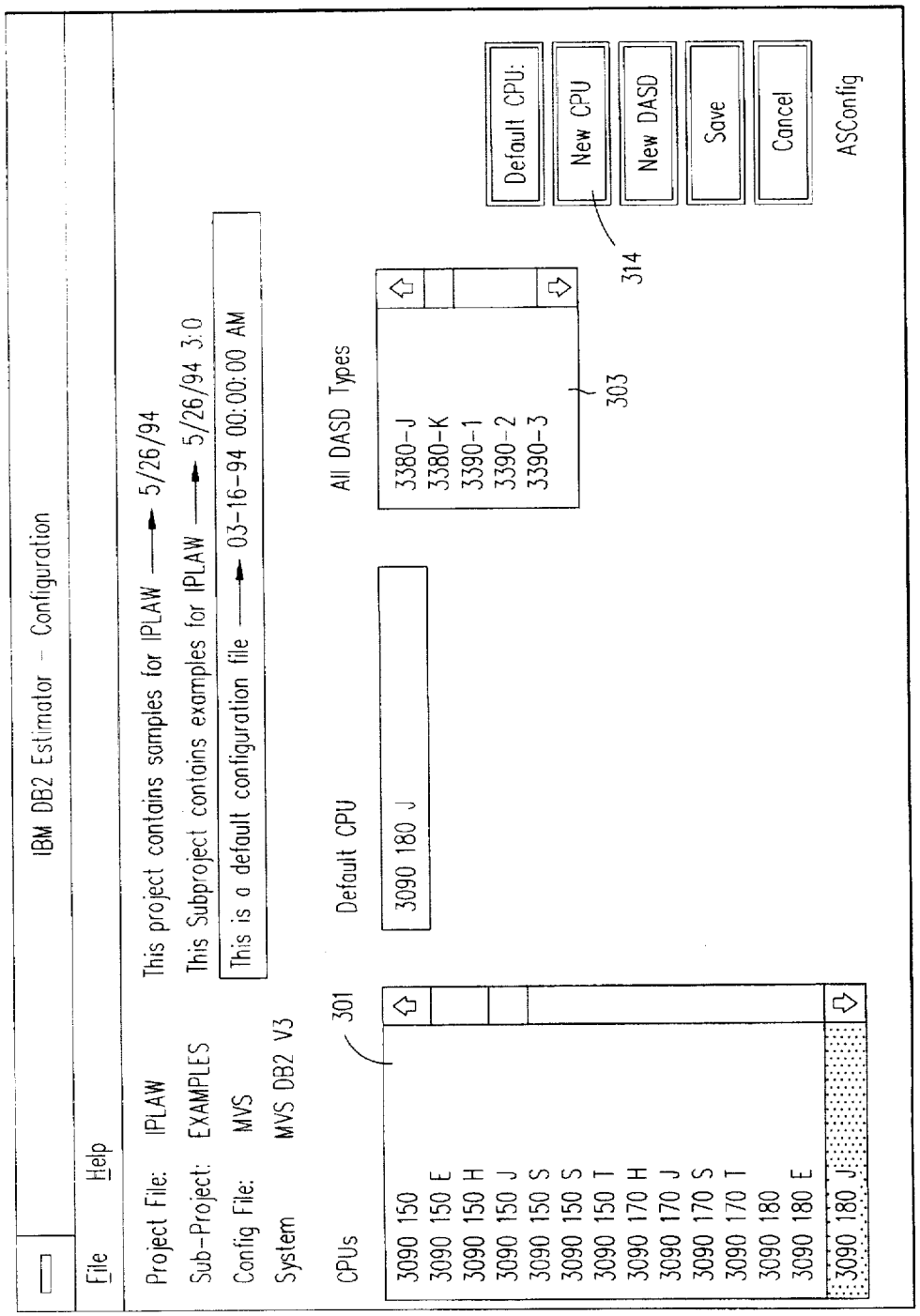
FIG. 3A shows a graphical user interface of the tool of this invention for receiving as input information pertaining to the CPU and DASD.
Figure 3B:
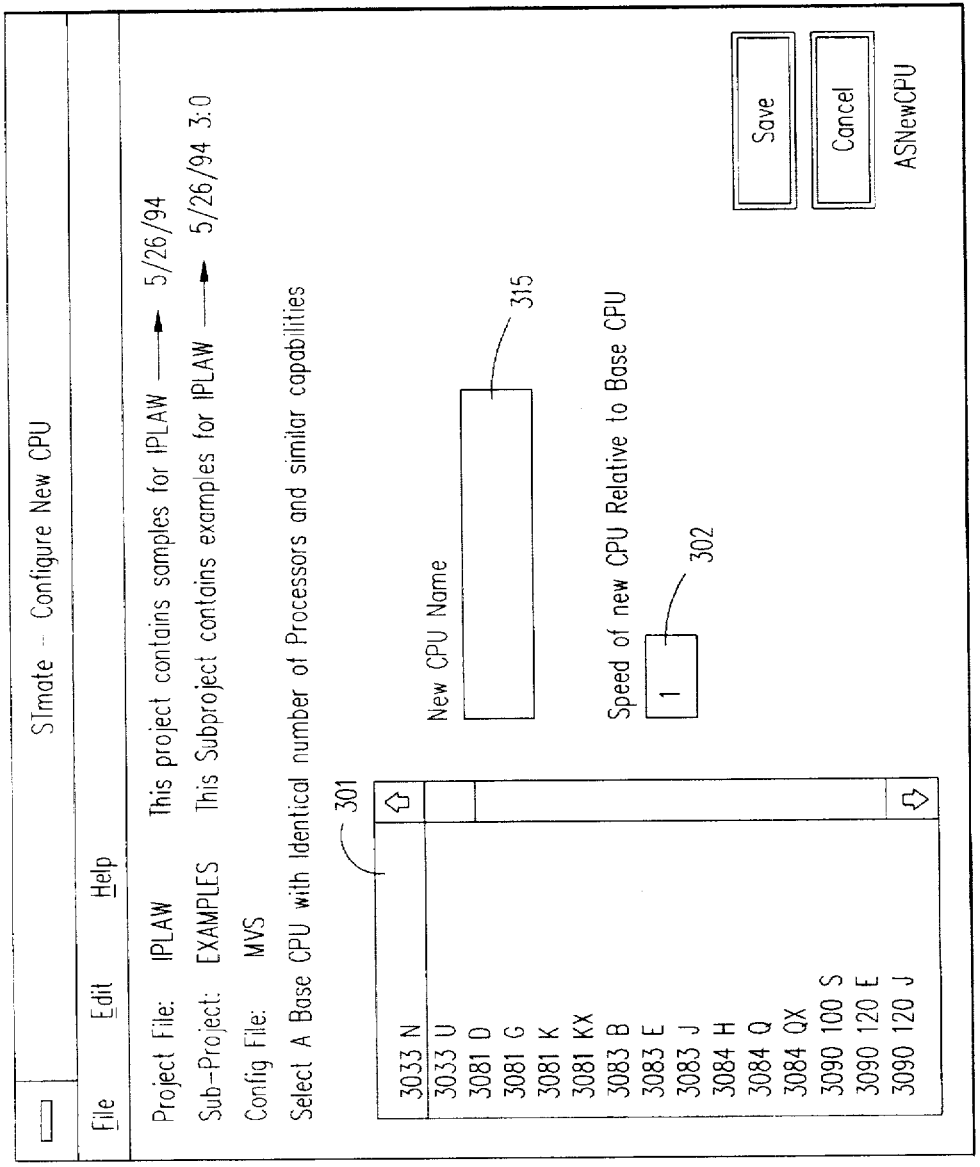
FIG. 3B shows a graphical user interface of the tool of this invention for adding a CPU not on the CPU list of FIG. 3A.
Figure 3C:
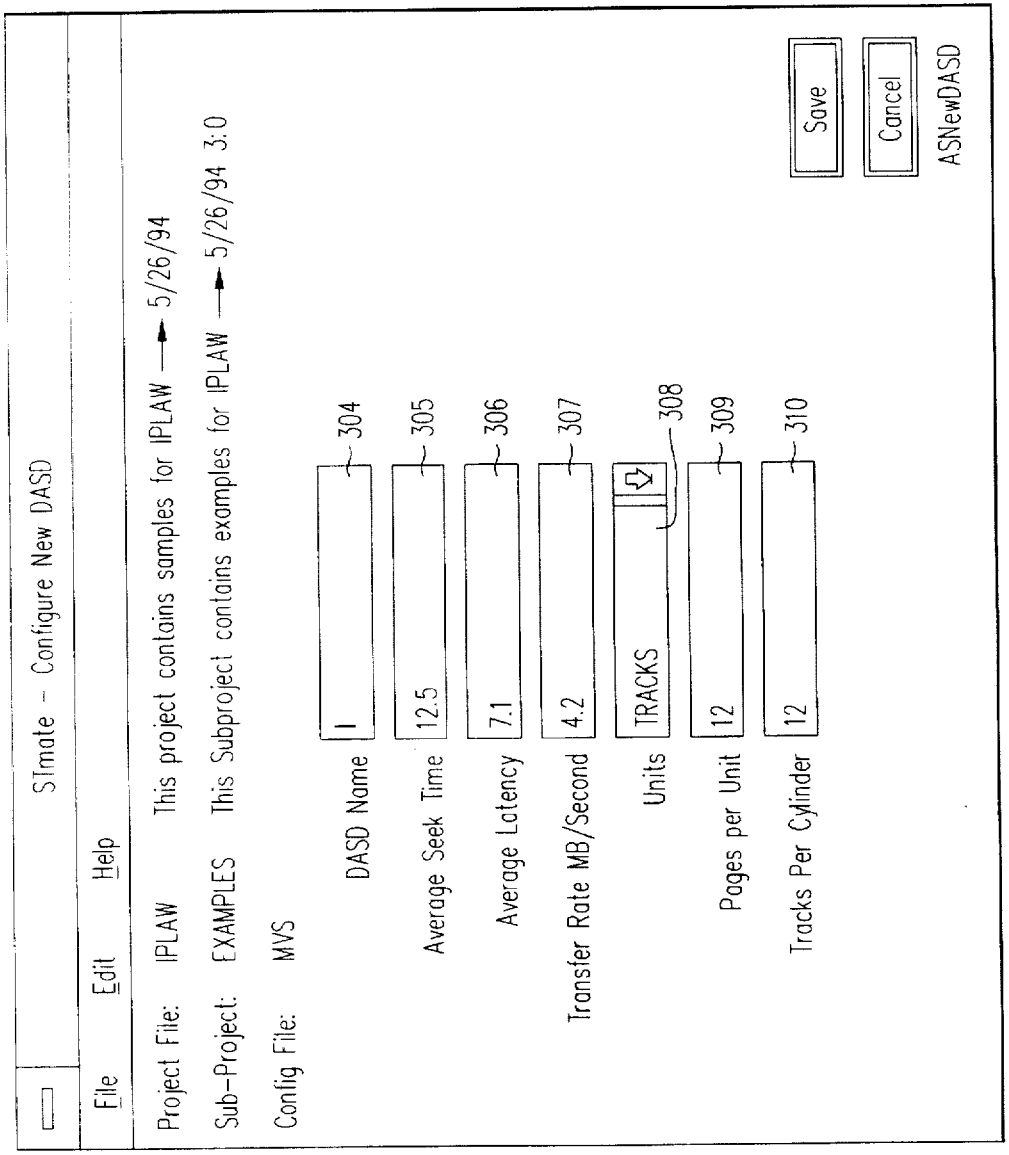
FIG. 3C shows a graphical user interface of the tool of this invention for adding a DASD not on the DASD list of FIG. 3A.

In FIG. 3A, the user can select a CPU from a list 301 of CPU's to be used as the default CPU for all estimations, or add CPU's to the list by selecting the new CPU button 314 in FIG. 3A, and entering a name for the new CPU 315, FIG. 3B, selecting a reference CPU name from the list 301, and by putting a multiplier 302 representative of the speed of the added CPU relative to the speed of the CPU being referenced. A DASD can also be selected from a list of DASD 303, FIG. 3A, to be used as the default DASD type 227, FIG. 2C, in the table definition, or a new dasd can be added by giving a name 304, FIG. 3C, and average seek time 305, average latency 306, a transfer rate in megabytes per second 307, a description of the unit such as tracks or sectors 308, the number of pages per unit 309, and the number of tracks per cylinder 310 if tracks were selected 308.

From this partial definition specified by the user through the graphical user interface as show in FIGS. 2A and 2B, the tool generates an expanded partial definition of a table, as shown in FIG. 2C. As shown in FIG. 2C, the tool creates the individual columns with the user input using either default column names 225 or column names 226 that have been specified by the user. In addition, in the table definition in FIG. 2C, the number of rows in the table are specified 220, the number of pages that are filled before an empty page is left is specified 221, and the percent of free space left on a page is specified 222.

As shown above, only a partial definition of a table has been entered by the user, and the inputs have been simple. In fact, not requiring the user to input all aspects of a table definition is a major simplification from prior art methods. In the above process steps, a user may enter inputs beyond those required (such as specifying column names and the order the columns will be in the table), but this is not required.

It should be noted that this estimation tool can be used in conjunction with tables that have been fully defined to a database manager. These predefined table definitions can be downloaded for use in conjunction with the tool.

After the above inputs have been made, step 1, FIG. 1, the tool can estimate the amount of disk space that will be required to store the table, step 2, FIG. 1, by using the formulas specified in *IBM Database2 Version 2 Administration Guide* Volume 1, Release 2, September 1989, pages 2-24 to 2-28, which is hereby incorporated by reference, and enclosed as described below as DASD Storage for User Data.

DASD Storage for User Data

The amount of DASD space you need for your database is not merely the number of bytes of data; the true number is some multiple of that. That is, space required=M*(bytes of data).

The multiplier M depends on your particular circumstances. It includes factors that are common to all data sets on DASD, as well as others that are peculiar to DB2. It can vary significantly, from a low of about 1.25 to perhaps 4.0 or more. For a first approximation, perhaps set M=2 and skip to "Calculating the Space Required for a Table" below.

For more accuracy, calculate M as the product of the following factors:

| Factor | Allows for |
|---|---|
| Record overhead | 8 bytes of record header and control |

| Factor | | Allows for data, plus space wasted for records that do not fit exactly into a DB2 page. The factor can range from about 1.01 (for a careful space-saving design) to as great as 4.0. A typical value is about 1.10. |
|---|---|---|
| Free space | | Space intentionally left empty to allow for inserts and updates. You can specify this factor on the CREATE TABLESPACE statement. The factor can range from 1.0 (for no free space) to 200 (99% of each page used left free, and a free page following each used page). With default values, the factor is about 1.05. |
| Unusable space | | Track lengths in excess of the nearest multiple of page lengths. DB2 uses 4K pages, which are blocked to fit as many as possible on a track. The table below shows the track size, number of pages per track, and the value of the unusable-space factor for several different device types. |

| Device Type | 3380 | 3375 | 3350 | 3340 | 3330 |
|---|---|---|---|---|---|
| Track Size | 47476 | 35616 | 19069 | 8368 | 13030 |
| Pages per track | 10 | 8 | 4 | 2 | 3 |
| Factor value | 1.16 | 1.09 | 1.16 | 1.02 | 1.06 |

| Data set excess | Unused space within allocated data sets, occurring as unused tracks or part of a track at the end of any data set. The amount of unused space depends upon the volatility of the data, the amount of space management done, and the size of the data set. Generally, large data sets can be managed more closely, and those that do not change in size are easier to manage. The factor can range without limit above 1.02. A typical value is 1.20. |
|---|---|
| Indexes | Storage for indexes to data. For data with no indexes, the factor is 1.0; for a single index on a short column, the factor is 1.01; if every column is indexed, the factor can be greater than 2.0. A typical value is 1.20. For further discussion of the factor, see "Calculating the Space Required for an Index" below. |

The table below shows calculations of the multiplier M for three different database designs:

1. The "tight" design is carefully chosen to save space and allows only one index on a single, short field.

2. The "loose" design allows a large value for every factor, but still well short of the maximum. Free space adds 30% to the estimate, and indexes add 40%.

3. The "medium" design has values between the other two and might serve as a rule-of-thumb in an early stage of database design.

In each design, the device type is taken as 3350 or 3380, so the unusable-space factor is 1.16. M is always the product of the five factors.

| Factor | "Tight" Design | "Medium" Design | "Loose" Design |
|---|---|---|---|
| Record overhead* | 1.02 | 1.10 | 1.30 |
| Free space* | 1.00 | 1.05 | 1.30 |
| Unusable space* | 1.16 | 1.16 | 1.16 |
| Data set excess* | 1.02 | 1.25 | 1.50 |
| Indexes = | 1.02 | 1.20 | 1.40 |
| Multiplier M | 1.23 | 2.01 | 4.12 |

In addition to the space for your data, external storage devices are required for:

Image copies of data sets, which can be on tape.

System libraries, system databases, and the system log.

Temporary work files for utility and sort jobs.

A rough estimate of the additional external storage needed is three times the amount calculated above (space for your data) for DASD storage.

Calculating the Space Required for a Table

Space allocation parameters are specified in kilobytes. For a table to be loaded by the LOAD utility, the value can be estimated as shown below.

Let number of records be the total number of records to be loaded:

Let average record size be the sum of the lengths of the fields in each record (but at least a total of 30), using an average value for varying-length fields, and including the following amounts for overhead:
8 bytes for the total record
1 byte for each field that allows nulls
2 bytes for each varying-length field Let FLOOR be the operation of discarding the fractional a number, and Let CEILING be the operation of taking the next largest integer, if the number has a fractional part.

Then calculate as follows:

1. usable page size is the page size less 22 bytes of overhead (that is, 4074 for 4K pages or 32746 for 32K pages multiplied by (100−p)/100, where p is the value of PCTFREE.

2. records per page is FLOOR (usable page size/average size) but cannot exceed 127.

3. pages used is 2+CEILING (number of records/records per page).

4. total pages is FLOOR (pages used*(1+f)/f), where f is the (nonzero) value of FREEPAGE. If FREEPAGE is 0, then total pages is equal to pages used.

5. Finally, the estimated number of kilobytes is given by total pages multiplied by the page size (4 or 32).

For example, consider a table space containing a single table with the following characteristics:

number of records = 100000
average record size = 80 bytes
Page size = 4K
PCTFREE = 5 (5 percent of space is left free on each page).
FREEPAGE = 20 (one page is left free for each 20 pages used).

Then the calculations give the following results:
usable page size = 4074*0.95 = 3870 bytes
records per page = FLOOR(3870/80) = 48
pages used = 2+CEILING(100000/48) = 2086
total pages = FLOOR(2086*21/20) = 2190 estimated number of kilobytes = 2190*4 = 8760

Calculating the Space Required for an Index

The space required by an index, newly built by the LOAD utility, depends on the number of index pages at all levels. That, in turn, depends on whether the pages are divided into more than one subpage and whether the index is unique. The numbers of leaf pages (index pages that point directly to the data in your tables) and of nonleaf pages (index pages that contain the page number and the highest key of each page in the next-level index) are calculated separately.

The calculations that follow are divided into these cases:

1. An index with one subpage per page.

2. An index with more than one subpage per page.

In each case,

Let k be the length of the index key, that is, the sum of the lengths of all the columns of the key, plus the number of columns that allow nulls.

Let s be the proportion of available space (equal to (100−p)/100, where p is the value of PCTFREE).

Let n be the average number of duplicate keys in this index or 1 for a unique index. For a non-unique index, the number of leaf pages must be estimated from an expected number of duplicates in the index.

FLOOR be the operation of discarding the fractional part of a number.

CEILING be the operation of taking the next largest integer, if the number has a fractional part.

number of leaf pages is CEILING(number of table rows/ entries per page).

Case 1: An Index with One Subpage per Page

Calculate as follows:

entries per page=FLOOR($s*n*4050/(k+(4*n))$)

Case 2: An Index with More Than One Subpage per Page

Let m greater than 1 be the number of subpages per page. Then calculate as follow:

entries per page=FLOOR($s*n*(4067-m*(k+21))/(k+(4*n))$)

Explanation for Indexes

Each index entry consists of a key value, followed by one or more 4-byte pointers. (For a non-unique index, each index entry consists of a 6-byte prefix, a key value, followed by one or more 4-byte pointers.) A key value that points to more than one row is followed by a corresponding number of pointers.

Nonleaf pages: If there is more than one leaf page there must be at least one level of nonleaf pages. Each entry on a nonleaf page has an index key value and one pointer, and the nonleaf page is not divided into subpages. Hence, you can calculate the number of nonleaf pages on the second level from the formula in "Case 1: An index with One Subpage per Page." Take the number of index entries as the number of leaf pages rather than the number of rows in the table.

Similarly, if there is more than one nonleaf page, there must be a third level of nonleaf pages, and so on. But, for every level, you can use the formula of Case 1 again, taking the number of entries as the number of pages in the previous level.

The total space requirement: Finally, the number of kilobytes required for an index built by LOAD is 4*(p+2), where p is the total number of pages required for all levels of the index.

For an example of the entire calculation, assume that an index is to be defined with these characteristics:

It is unique.

The table it indexes has 100000 rows.

The key is a single column defined as CHAR(10) NO NULL.

The index has one subpage for each leaf page.

The calculations are shown in the table below.

Table for The Total Space Requirements for an Index

| Quantity | Calculation | Results |
|---|---|---|
| Length of key | (k) | 10 |
| Proportion of available space | (s):(100−10)/100 | 0.9 |
| Number of subpages per page | m | 1 |
| Average number of duplicate keys | n | 1 |
| Number of entries per page | FLOOR(4050 * 0.9/(10 + 4)) | 260 |
| Number of leaf pages | CEILING(100000/260) | 385 |
| Number of nonleaf pages on second level | CEILING(385/260) | 2 |
| Number of nonleaf pages on third level | CEILING(2/260) | 1 |
| Total index pages on all levels | 385 + 2 + 1 | 388 |
| TOTAL SPACE REQUIRED in kilobytes | 4 * (388 + 2) | 1560 |

After inputting a partial definition of a table, Step 1, FIG. 1, the user can continue to work with utilities, step 3, or SQL statements, step 5, as further described below.

As shown in FIG. 4, to estimate the costs of executing a utility against a table, step 4, FIG. 1, a user must select a utility type (INCREMENTAL IMAGE COPY 401, FULL IMAGE COPY 402, LOAD 403, REORG 404, RUNSTATS 405), and the table 406 that it will act upon. For some utilities, such as the IMAGE COPY utility, an additional piece of input may be required such as the amount of update activity 407 that has happened to the table since the last time the utility was run.

With only this minimal amount of user input, the user can obtain an estimate of the costs of executing the utility. These costs include the amount of CPU time that will be required, the amount of disk activity that will happen, and the minimal amount of elapsed time that this process could complete in if nothing interferes. The CPU and I/O times for a utility are calculated as further described below.

Utilities Cost Formulas

Notations and Assumptions

| | |
|---|---|
| BSAM = | basic sequential access method for input/output |
| K = | kilobyte (1024) |
| I/O = | input and output to external computer media |
| IOT = | average I/O time; 35 ms for 3330, 25 ms for 3350, 20 ms for 3380, 16 ms for 3390 |
| NC = | number of columns in row in Load |
| = | number of physical leaf pages of clustered index in Reorg |
| NIX = | number of indexes for a given table if Load; tablespace otherwise |
| NL = | average number of physical leaf pages |
| NP = | number of data pages for a given table if Load; tablespace otherwise |
| NPC = | number of pages between commits |
| NPU = | number of pages containing updated rows (PPU × NP) |
| NPW = | number of pages written in 1 I/O (32 pages) |
| NR = | number of rows in a given table if Load; tablespace otherwise |
| NS = | number of sorted rows = Nr × NIX |
| NT = | number of pages per track; 3 for 3330, 4 for 3350, 10 for 3380, 12 for 3390 |
| MB = | megabyte (1,048,576) |
| PPU = | % pages containing updated rows |

| | |
|---|---|
| SPFU = | number of pages prefetched (64 pages) |
| R = | device rotation time = .0167 seconds (3380) os .0141 (3390) |
| SIO = | number of pages read or written in sort intermediate workfile I/O |
| = | 2SP × SM |
| SM = | number of merge passes |
| = | 1 if SP > 307 (=(1.8 × 2MB/3)/4K page) assuming 4MB storage to work with |
| = | 0 otherwise |
| SP = | number of pages of sorted rows = NIX × NL × 1.3 Multiplier 1.3 is used, since index key is padded to the length of largest key among all indexes. |

Model intended for utilities which take minutes more.

I/O tuning done to avoid frequently-accessed datasets on the same volume

Single-table tablespace

VS Sort used in Load/Reorg

Load input data size approximately equal to output data size

No input field conversion in Load 32K blocksize for BSAM input in Load

IMAGE COPY MODEL

This utility is used to make a copy (backup, recovery, transport) of data in Database 2 tablespaces, either a complete copy or a partial copy containing only data that was added or changed (incremental copy).

The same formula is to be used for both full image copy and incremental image copy. For incremental image copy, NP is replaced by PPU×NP. Buffer Manager interface is used directly to process a page rather than a row.

| INPUT/OUTPUT FORMULA | |
|---|---|
| $IO\ time = \frac{NP}{SPFU} \times \left( R + \frac{SPFU \times R}{NT} \right)$ | Buffer Manager read in full copy |
| $NPU \times (R = R/NT)$ | Buffer Manager read in incr. copy |
| $+ \frac{NP}{16} \times \left( \frac{R}{2} = \frac{16R}{NT} \right)$ | BSAM write 4 16K pages in 1 I/O |
| $+ \frac{NPU}{NPW} \times \left( \frac{R}{2} + \frac{2 \times NPW \times R}{NT} \right)$ | BufMgr write to reset change bit |
| $+(R/2 + R/NT) \times NP/NPC$ | BufMgr write for space-map page per commit |
| $+2IOT \times NP/NPC$ | 2 log I/O's per commit |

| PATH LENGTH FORMULA | |
|---|---|
| Pathlength = (NP/SPFU) × (7000 + 450 × SPFU) + 1380 × NP +5000 × NP/8 + 1000 × NP +(NPU/NPW) × (7000 + 450 × NPW) + 1380 × NPU +20000 × NPC | Buffer Manager read BSAM write BufMgr write to reset change bit Commit every NPC pages |

RUNSTATS MODEL

This utility is used to analyze Database 2 indexes and tablespaces and generate statistical data for the system catalog. The statistical data is used by a Database 2 optimizing process to access the data in the most efficient manner.

| INPUT/OUTPUT FORMULA | |
|---|---|
| $IO\ time = \frac{NP}{SPFU} \times \left( R + \frac{SPFU \times R}{NT} \right)$ | Buffer Manager read of data |
| $\frac{NIX \times NL}{SPFU} \times \left( R + \frac{SPFU \times R}{NT} \right)$ | Buffer Manager read of index |

| PATH LENGTH FORMULA | |
|---|---|
| Pathlength = (NP/SPFU) × (7000 + 450 × SPFU) + 1000 × NP +NIX × NL × (5000 + 1000) | Buffer Manager read of data Buffer Manager read of index |
| +430 × NR | Get each row of the tablespace |
| +620 × NR × NIX | Get each row of each index |

LOAD and REORG MODELS

The LOAD utility is used to initially populate Database tables from data stored externally from the Database 2 system. This model assumes the format of data is not changed when loading (although the utility does support this function).

The REORG utility is used to reorganize data stored in Database 2 tables in a more optimal physical ordering to allow more efficient accessing of the data. Data stored in these tables tend to become disorganized as data is added, deleted, and changed.

These two utilities are combined in one model because there is a lot of common processes between them with similar cost formulas.

Some customer measurements indicate Load CPU time in cost model is accurate for CHAR columns but too small for DECIMAL (1.7×). Relative column cost with CHAR(4) as base: CHAR(4) INTEGER DEC(7)

1 1.1 1.8 MIPS factor used for LOAD and REORG is 1.45 REORG only process (UNLOAD PHASE)

| INPUT/OUTPUT FORMULA | |
|---|---|
| $IO\ time = + \frac{NP}{SPFU} \times \left( R + \frac{SPFU \times R}{NT} \right)$ | Buffer Manager read of data |
| $+ \frac{NP}{8} \times \left( R + \frac{8R}{NT} \right)$ | BSAM write |
| $+2IOT \times NP/NPC$ | 2 log I/O's per commit |
| $+ \frac{NP}{8} \times \left( \frac{R}{2} + \frac{8R}{NT} \right)$ | Sort formula - BSAM Read |
| $+ \frac{2NP \times SM}{NT} \times \left( \frac{R}{2} + R \right)$ | Sort - intermediate workfile I/O |
| $+ \frac{NP}{8} \times \left( \frac{R}{2} + \frac{8R}{NT} \right)$ | write to output file |

| PATH LENGTH FORMULA | |
|---|---|
| Pathlength = +((NP/SPFU) × (7000 + 450 × SPFU) + 700 × NP) | BM read of data |
| +950 × NR | Pathlengths per row |
| +6000 × NP | Write the unloaded data BSAM blocks |
| +100000 × NP/NPC | Commit every NPC of data unloaded |
| +250 × NR | sort input and output with E15 and E35 exit |
| +100 × NR × SM | sort merge |

| | |
|---|---|
| $+5000 \times \left(2 \times NP + \dfrac{2 \times NP \times SM}{NT}\right)$ | BSAM I/O |
| $+1000 \times (2 \times NP + 2 \times NP \times SM)$ | per page overhead |

LOAD and REORG common process (LOAD PHASE)

INPUT/OUTPUT FORMULA

| | |
|---|---|
| IO time $= \dfrac{NP}{8} \times \left(\dfrac{R}{2} + \dfrac{8R}{NT}\right)$ | BSAM read of 32K block input |
| $\dfrac{NP}{2} \times \left(R + \dfrac{2R}{NT}\right)$ | BSAM read, if Load from unloaded dataset |
| $+\dfrac{NIX \times NL}{8} \times \left(R + \dfrac{8R}{NT}\right)$ | BSAM write of Key for each index |
| $+1.1 \times 2 \times R \times NP/NT$ | Preformat write |
| $+\dfrac{NP}{NPW} \times \left(\dfrac{R}{2} + \dfrac{NPW \times R}{NT}\right)$ | Buffer Manager write |
| $+2IOT \times NP/NPC$ | 2 log I/O's per commit; takes place even if LOG NO because of SYSUTIL update. |

PATH LENGTH FORMULA

| | |
|---|---|
| Pathlength = | |
| $+12000 \times NP/8$ | Read from BSAM input - LOAD |
| $6000 \times NP/2$ | Read from BSAM input - REORG |
| $+985 \times NR$ | Overhead of LOAD of each row |
| $700 \times NR$ | Overhead for REORG of each row |
| $+Nr \times 192 \times NC$ | Load each col of each row if LOAD |
| $+Nr \times 800 \times NC$ | for each variable-length column LOAD |
| $+402 \times NR \times NIX$ | Extract key/rid pairs for each index |
| $+4000 \times NP$ | Validity check on the page |
| $+NIX \times NL \times$ $(2000 + 6000/2)$ | BSAM write the index data with 1 I/O every other page |
| $+6500 \times NP/NT$ | Preformat tablespace |
| $+(2 \times NP/NPW) \times$ $(10000 + 500 \times NPW)$ | Buffer Manager write data pages |
| $+100000 \times NP/NPC$ | Commit data being loaded |

Sort for indexes:
The following assumptions are made:
VS Sort is used
Full track read/write for sort workfile is assumed.
DB2 utility always uses disk sort, E15 and E35 exit routines, and fixed length rows
REORG skips SORT if the number of index is 1 or none.

| | |
|---|---|
| $SP = NIX \times NL \times 1.3$ | if NIX > 1 |
| NL | if NIX = 1 |

INPUT/OUTPUT FORMULA

| | |
|---|---|
| IO time $= \dfrac{NIX \times NL}{8} \times \left(\dfrac{R}{2} + \dfrac{8R}{NT}\right)$ | BSAM read |
| $+\dfrac{S10}{NT} \times \left(\dfrac{R}{2} + R\right)$ | intermediate workfile I/O |
| $+\dfrac{NIX \times NL}{8} \times \left(\dfrac{R}{2} + \dfrac{8R}{NT}\right)$ | write to output file |

PATH LENGTH FORMULA

| | |
|---|---|
| Pathlength = $250 \times NS$ | sort input and output with E15 and E35 exits |
| $+100 \times NS \times SM$ | sort merge |
| $+5000 \times \left(2 \times NIX \times NL + \dfrac{SIO}{NT}\right)$ | BSAM I/O |
| $+1000 \times (2 \times NIX \times NL + SIO)$ | per page overhead |

Build indexes:

INPUT/OUTPUT FORMULA

| | |
|---|---|
| $SP = NIX \times NL$ | |
| IO time $= \dfrac{SP}{8} \times \left(\dfrac{R}{2} + \dfrac{8R}{NT}\right)$ | Read from sort output file |
| $+NIX \times 100 \times IOT$ | Non-DB2 I/O's |
| $+\dfrac{SP}{NPW} \times \left(\dfrac{R}{2} + \dfrac{NPW \times R}{NT}\right)$ | Buffer Manager write |
| $+2 \times IOT \times SP/NPC$ | 2 log I/O per commit |
| $+1.1 \times 2 \times R \times NP/NT$ | Preformat write |

PATH LENGTH FORMULA

| | |
|---|---|
| Pathlength = $(1200 + 1500) \times SP$ | Read the index data |
| $+60 \times NIX \times NR$ | Read index |
| $+1000 \times SP$ | Process new page |
| $+370 \times NR \times NIX$ | Load each index record |
| $+NIX \times 2000000$ | Open/close of index pagesets |
| $+10000 \times SP \times 2/NPW$ | Buffer Manager write |
| $+100000 \times SP/NPC$ | Commit |
| $+6500 \times NP/NT$ | Preformat write |

Data is supplied for the variables of these cost formulas based on the amount and definition of the user's data. The result from the calculation of these formulas is the amount of time in seconds the do input/output of the data and the number of computer instructions for a given Database 2 utility.

The following describes how the parameters for the formulas specified above are generated from user inputs.

Figure 2D:
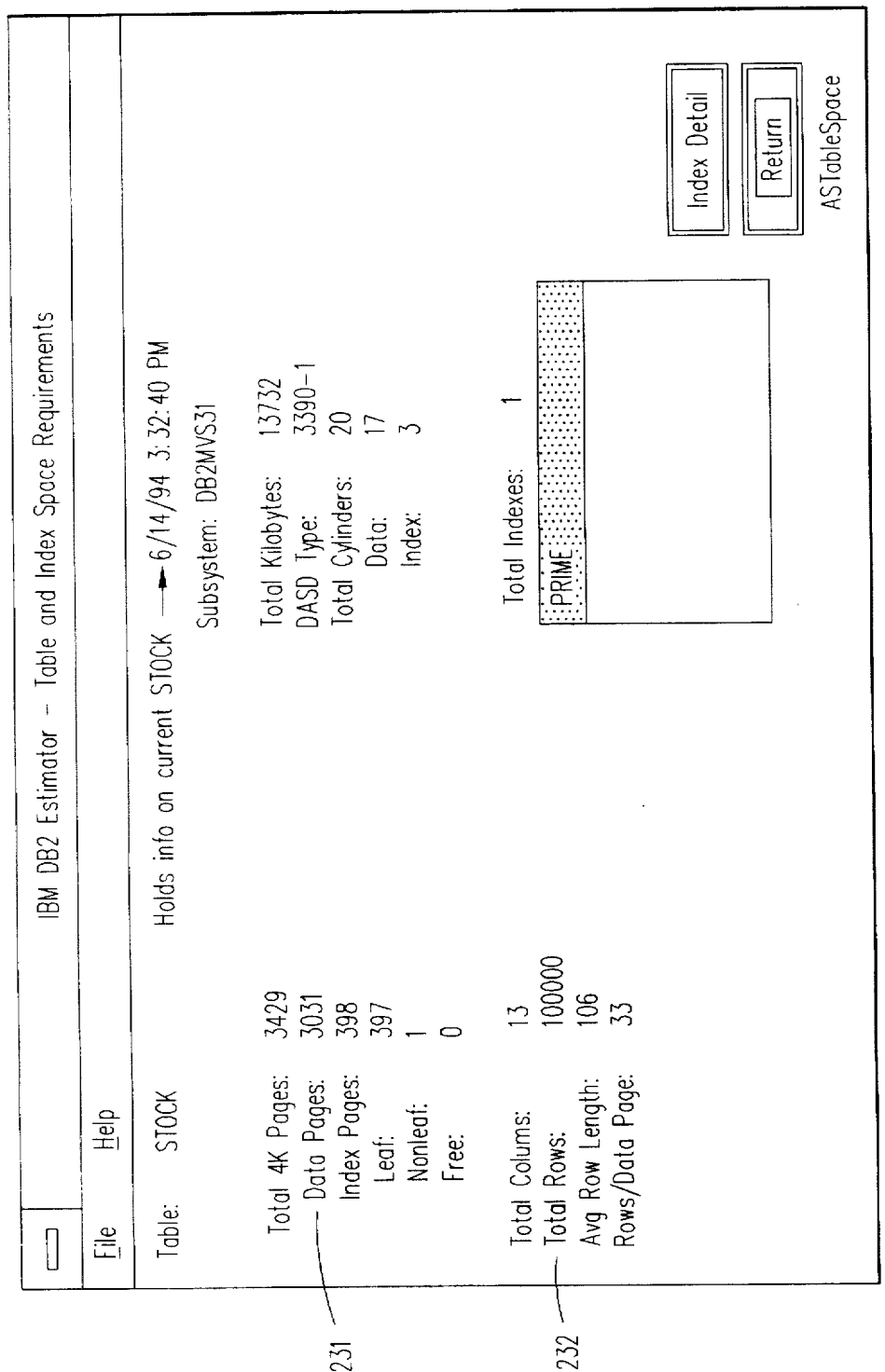
FIG. 2D shows the table and overall index space requirements as generated by the tool.
Figure 2E:
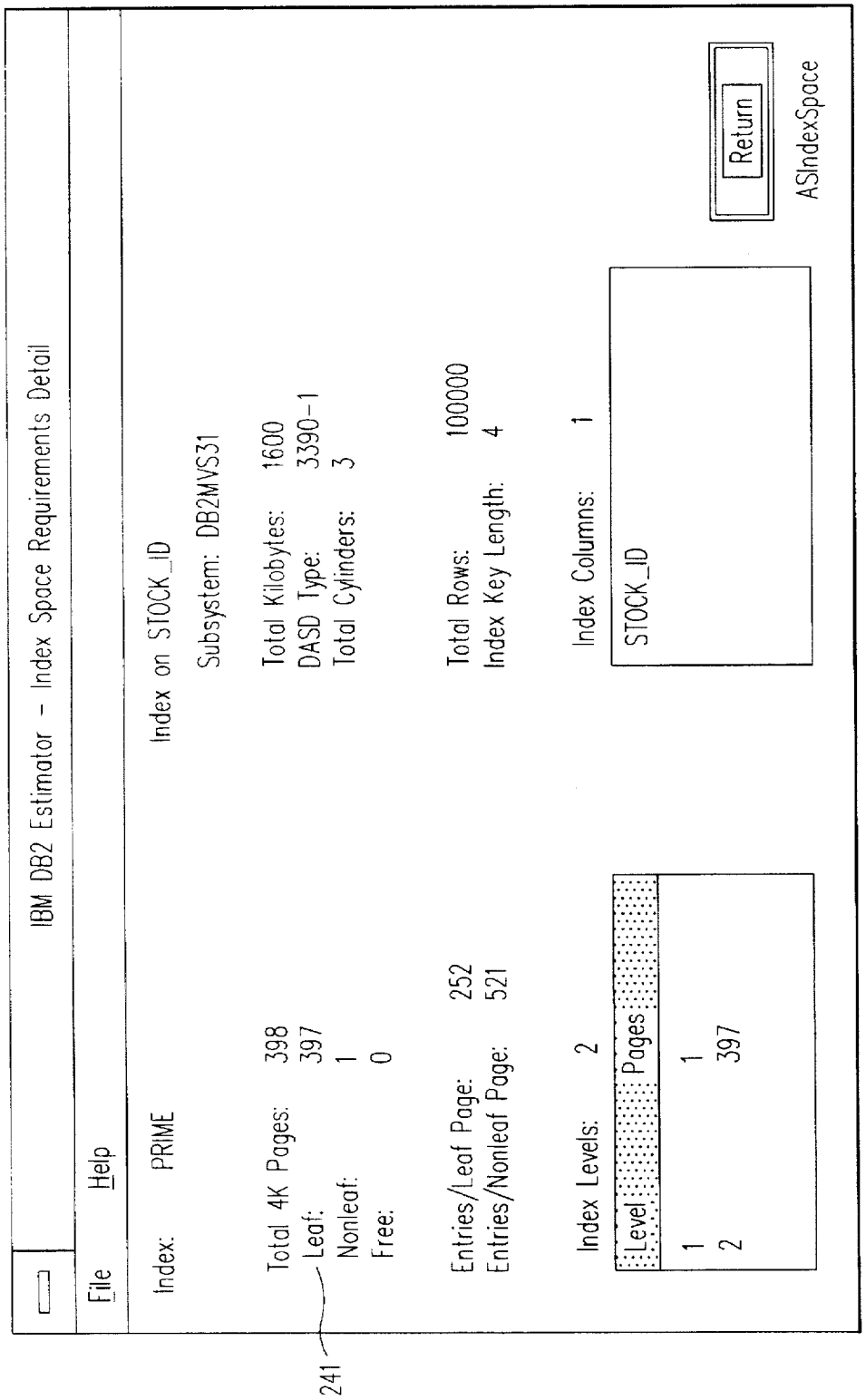
FIG. 2E shows the index space requirements, for a specific index, generated by the tool.

NC is the number of columns 223, FIG. 2C, in a row of a table loaded by a LOAD utility, or the number of physical leaf pages 241, FIG. 2E, of clustered index in a REORG utility.

NIX is the number of indexes 224, FIG. 2C for a given table.

NP is the number of data pages 231, FIG. 2D, for a given table.

NPC is the number of pages between commits, and is assumed to be 1000.

PPU is the percent (%) of pages containing updated rows 407, FIG. 4.

NPU is the number of pages containing updated rows which is calculated as PPU*NP.

NPW is the number of pages written in one I/O, and is assumed to be 32.

NR is the number of rows 232, FIG. 2D, in a given table.

NS is the number of sorted rows, and is calculated as NR*NIX.

NT is number of pages per track, which depends on the DASD used.

SPFU is the number of pages prefetched, and is assumed to be 64.

R is the device rotation time, which depends on the DASD used.

To determine the CPU time for the utility, the pathlength formula described above is used for that utility, which is then divided by the speed of the processor in mips. The tool associates a mips value for specific processors specified in FIG. 3A and FIG. 3B. To determine the I/O time, the I/O formulas described above are used. The elapsed time for a utility is determined according to copending patent application Serial Number [Internal Docket Number ST9-94-014] incorporated herein by reference, and as further discussed below.

An additional way in which this tool can obtain the information necessary to provide an estimate of the cost of a utility against a table is also available, but it is the same as previously known methods in the art. Alternatively, a user would again select the utility type, but instead of selecting a predefined table, the following items are specified: 1) the DASD type for all utility types, 2) the number of pages for all utility types, 3) the percent pages that have been updated since the last image copy for incremental and full image copies, 4) the number of rows, 5) the number of indexes, 6) the number of index pages for the utilities LOAD, REORG, and RUNSTATS, and 7) the number of columns for the utilities LOAD and REORG. Figuring out how to calculate the above necessary input values from what the user knows about the data tends to be a more difficult and complicated task for the user.

After creating one or more tables, step 1, FIG. 1, the user can continue with an SQL statement, step 5, FIG. 1. The inputs necessary to obtain an estimate of the CPU time, I/O time and elapsed time from an SQL statement can be categorized into two different types and are entered by the user in two different steps, step 5 and step 6 of FIG. 1. The first type of input from the user is the SQL statement itself. As shown in step 5, the user defines a partial and simplified SQL statement or modifies an existing SQL statement. The second type of input is related to how the database manager will access the database to obtain the answer set that was requested by the SQL statement. As shown in step 6, FIG. 1, the user defines or modifies the access order, the access method and the rows or pages.

As shown in FIGS. 5A, 5B, 5C, 5D, and 5E, this tool provides a simple GUI interface whereby the user can point and click to create the simplified SQL statement. The tool of this invention is simple to use because this tool only needs to get inputs that will be needed in estimating the costs of performing the SQL, and not for executing the SQL statement.

For example, the process of specifying a query statement for the 'joining' of two or more tables can be very complicated. With this tool, when columns (not necessarily the JOIN columns) from two or more tables 551, 552, FIG. 5F are selected and added, a partial simplified JOIN predicate 550 is automatically generated for the user, as shown by the "?=?", 550. The user does not need to input any information about what the JOIN columns are, or what the JOIN predicate is. As such, the SQL statement that is generated could not actually be executed, but it is sufficient for the purposes of estimating the costs.

Figure 5A:
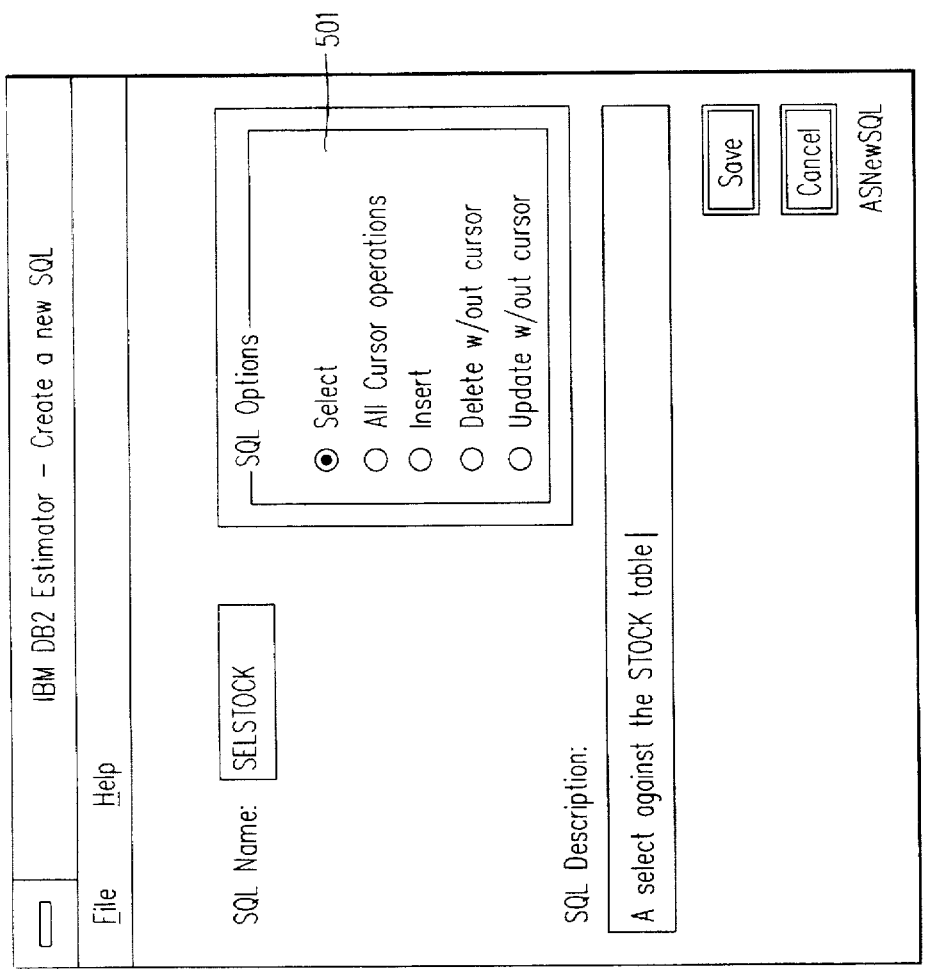
FIG. 5A shows a graphical user interface for receiving a partial and simplified definition of any SQL statement type.
Figure 5B:
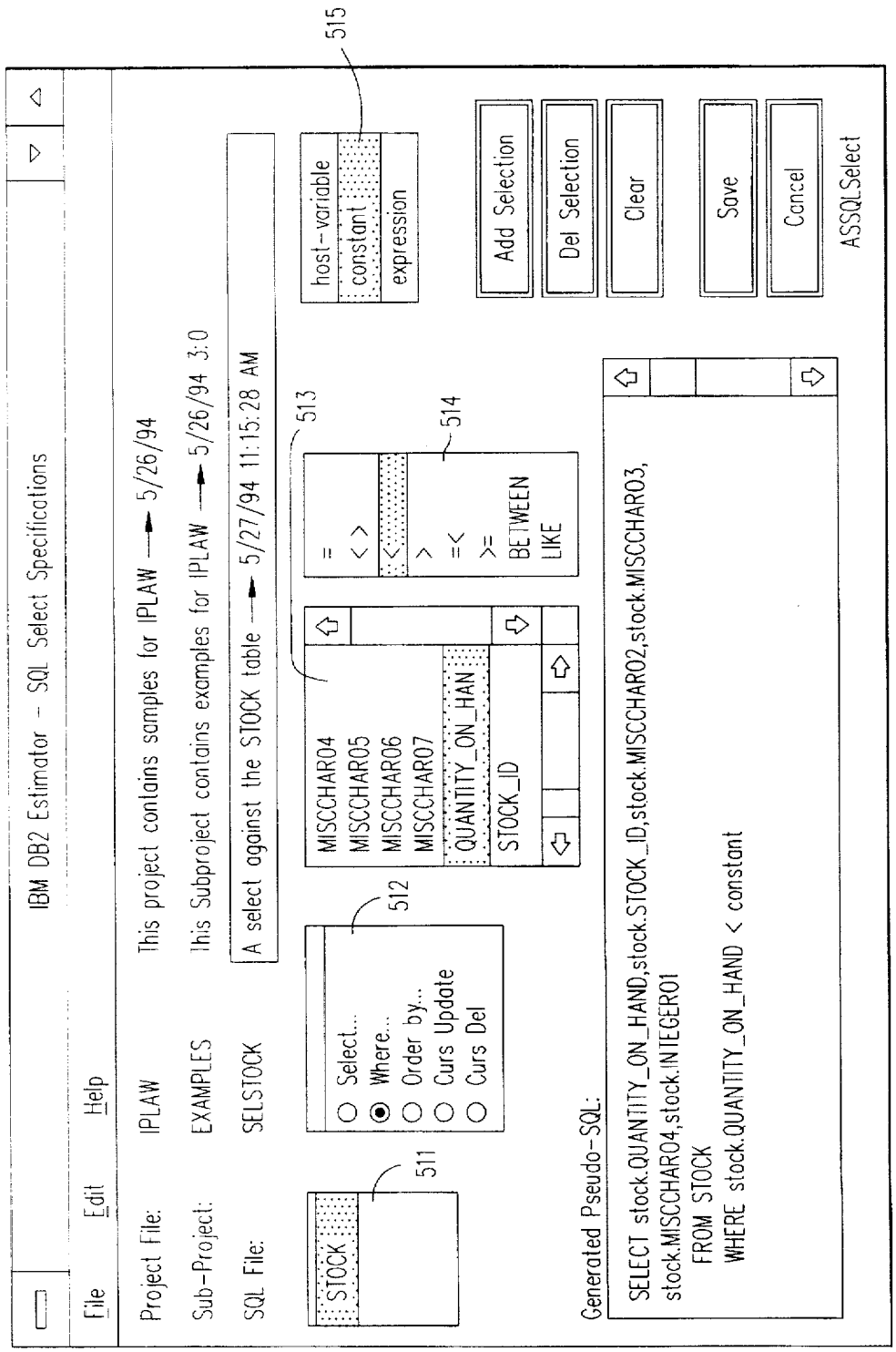
FIG. 5B shows a graphical user interface for receiving a partial and simplified definition of an SQL statement when the statement type is SELECT.
Figure 5C:
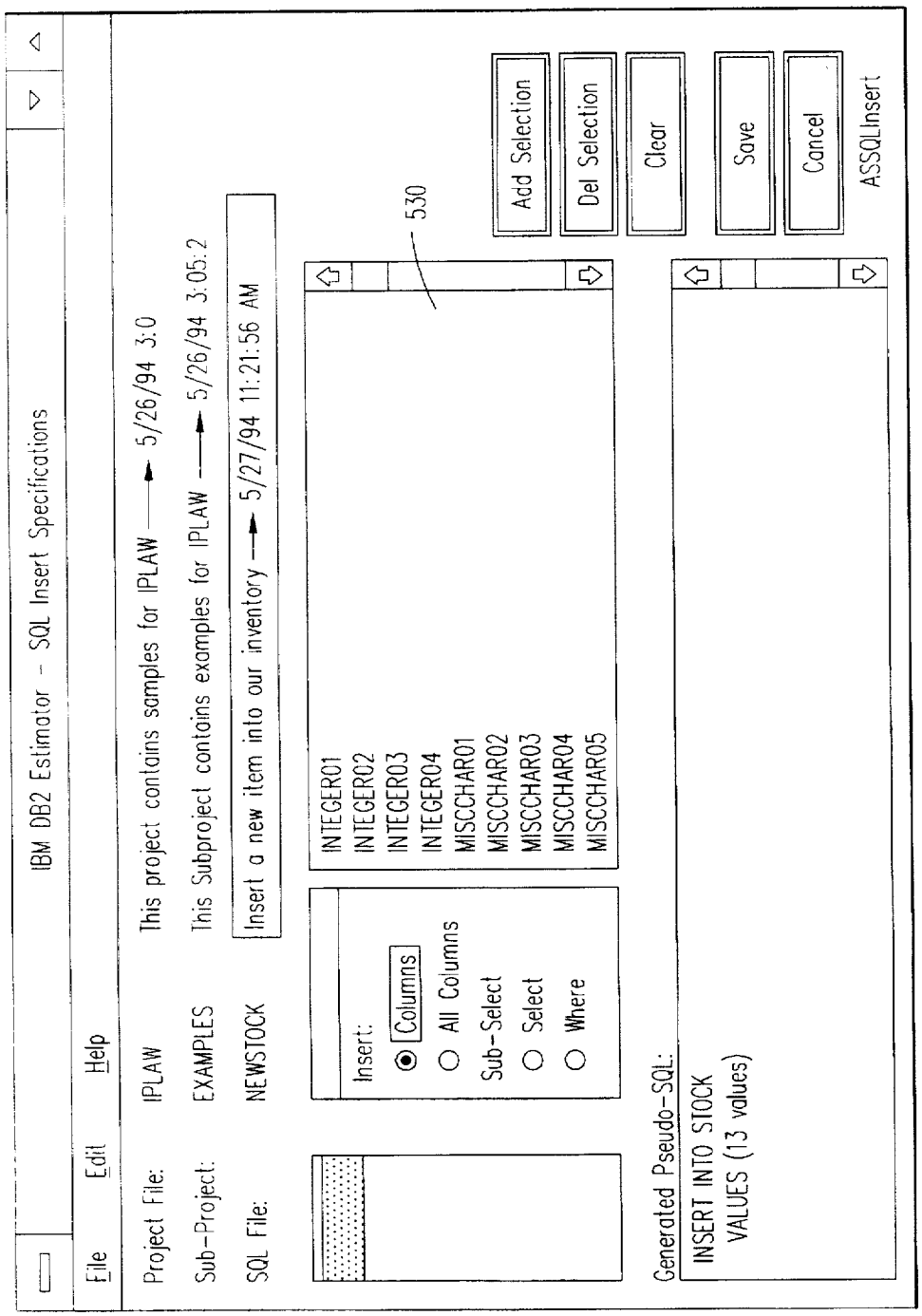
FIG. 5C shows a graphical user interface for receiving a partial and simplified definition of an SQL statement when the statement type is INSERT.
Figure 5D:
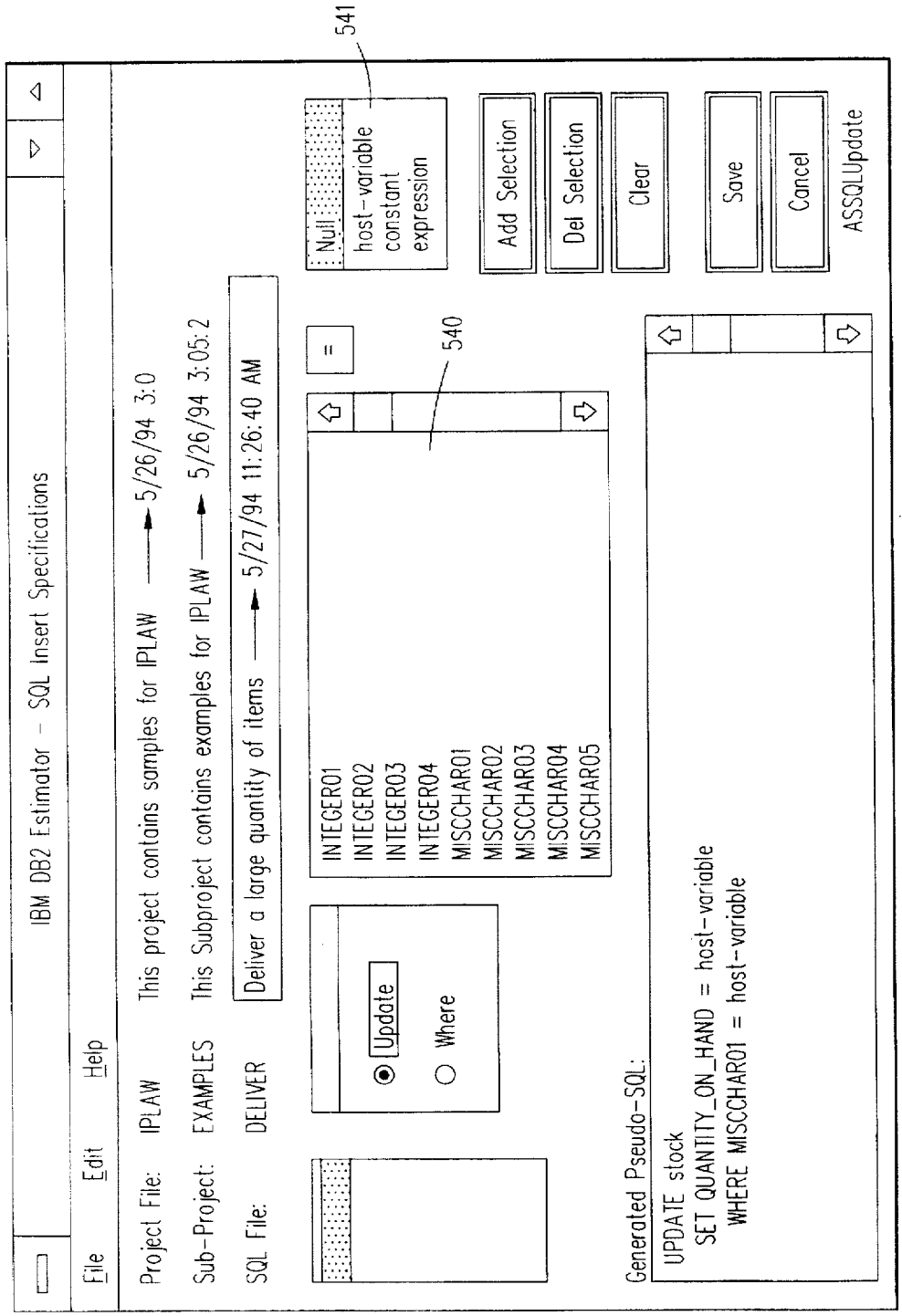
FIG. 5D shows a graphical user interface for receiving a partial and simplified definition of an SQL statement when the statement type is UPDATE.
Figure 5E:
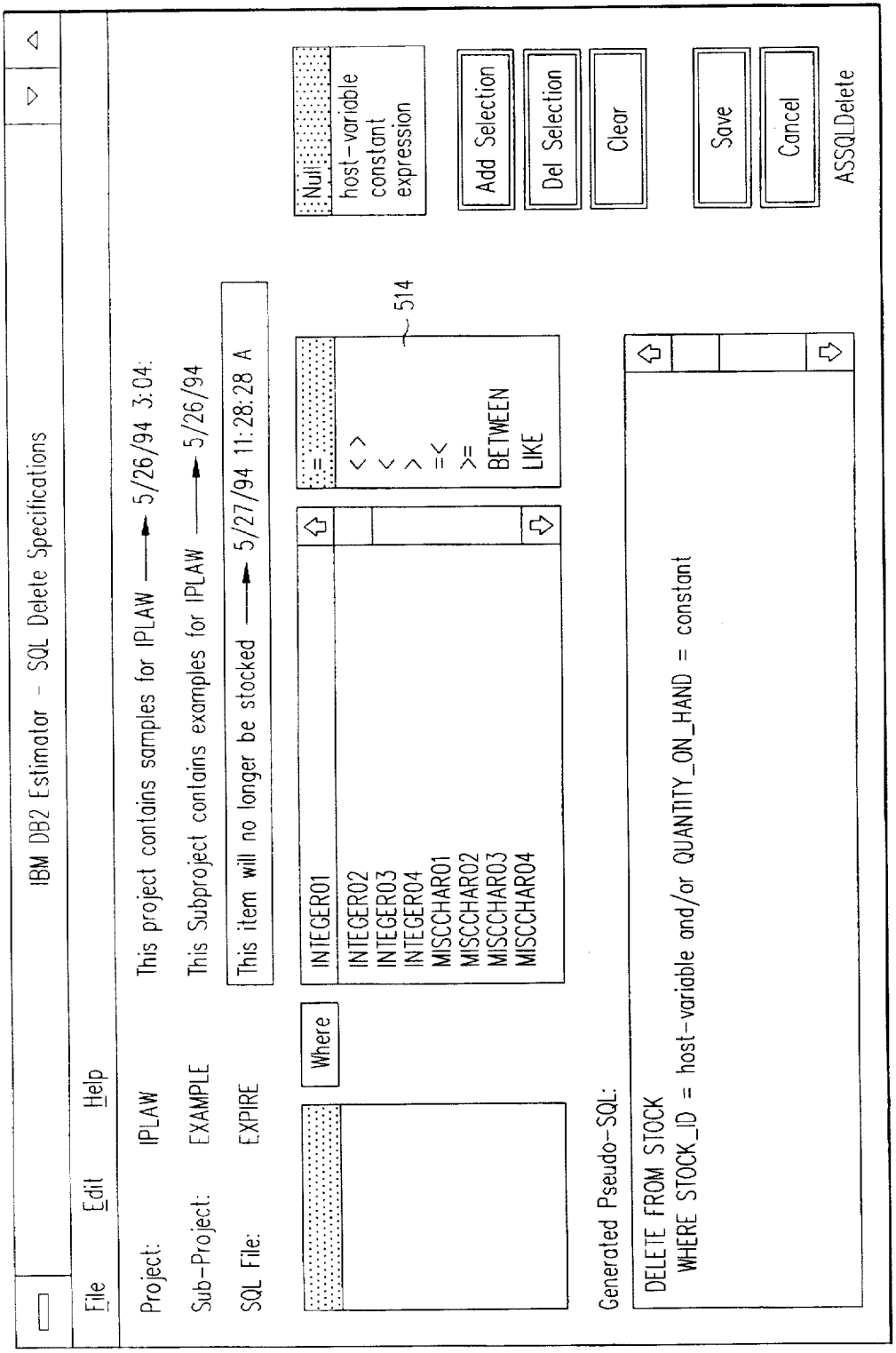
FIG. 5E shows a graphical user interface for receiving a partial and simplified definition of an SQL statement when the statement type is DELETE.
Figure 5F:
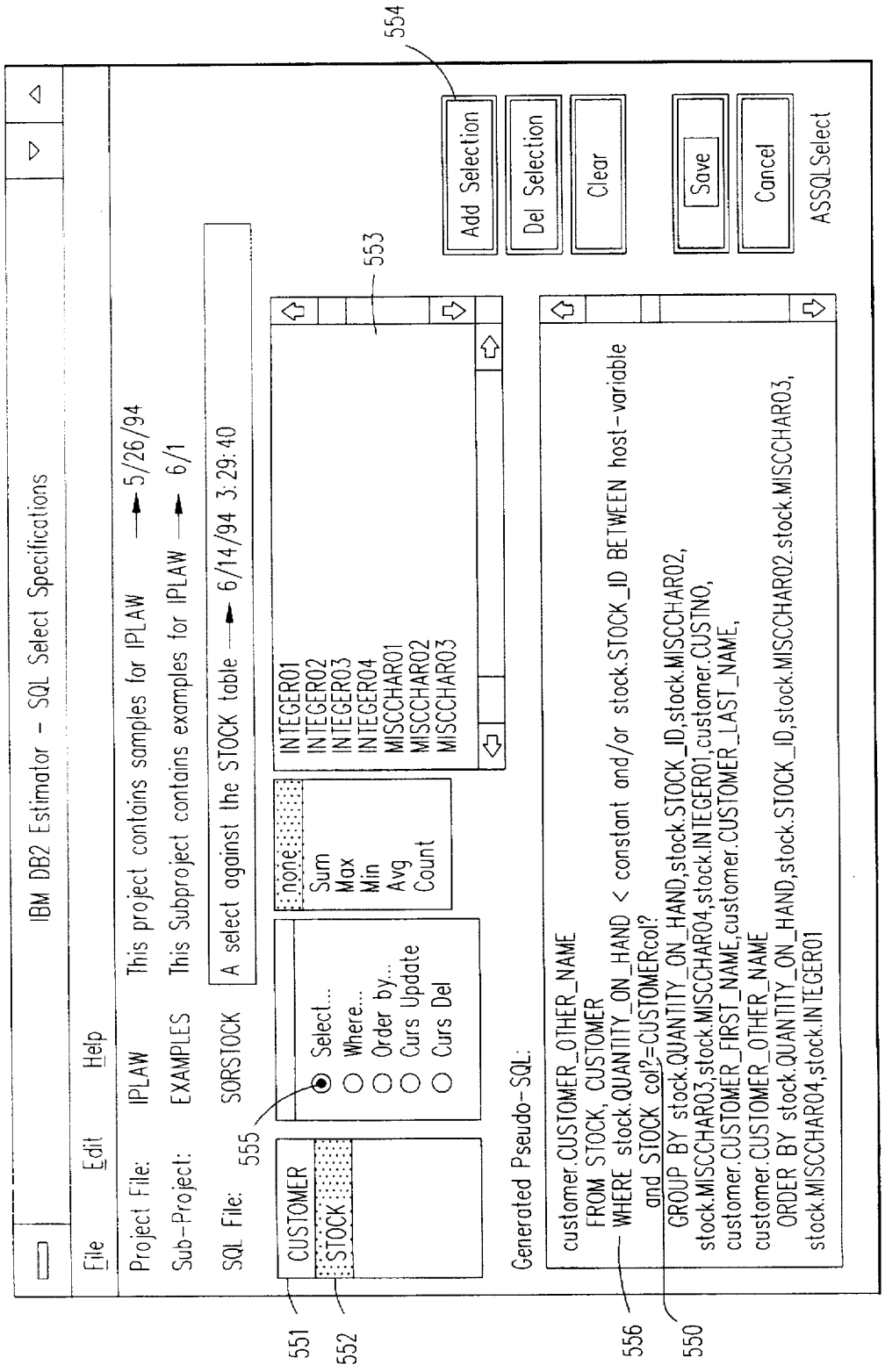
FIG. 5F shows a SQL SELECT statement, generated by the tool, that involves a relational database JOIN operation of two tables.
Figure 5G:
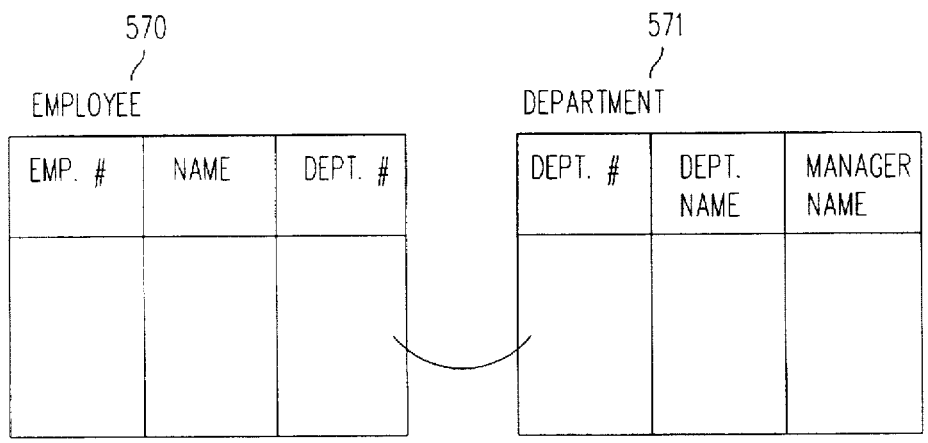
FIG. 5G illustrates two tables to be JOINed.

To illustrate a relational database JOIN operation, the "Employee" table 570 and "Department" table 571 are shown in FIG. 5G. If the desired query output was the manager of a specific named employee, the table "Employee" 570 would be selected and the column "Name" would be selected. These selections would be added by the "add selection" button 554, FIG. 5F. Then the table "Department" 571, FIG. 5G, would be selected and the column "Manager" would be selected. Again the selections would be added by the "add selection" button 554, FIG. 5F. In addition, the JOIN predicate "EMPLOYEE.DEPT#=DEPARTMENT.DEPT#" will also be generated by the tool. The following resulting simplified and partial SQL statement would appear in box 556, FIG. 5F:

SELECT EMPLOYEE.NAME, DEPARTMENT.MANAGER
FROM EMPLOYEE,DEPARTMENT
WHERE EMPLOYEE.NAME=CONSTANT
AND EMPLOYEE.DEPT#=DEPARTMENT.DEPT#

As shown above, the tool does not require the user to know that the two tables have to be JOINed by the respective department number columns.

Another example illustrating the simplicity of the tool in specifying the predicates is as follows. Normally, in specifying a SQL statement, it is necessary to specify the exact value of a predicate, e.g., whether a predicate was State = "California", or State = "Maine". With the tool of this invention, the process is greatly simplified by only inputting that State = constant, which is sufficient in computing the costs of the SQL statement.

More specifically, as shown in FIG. 5A, the statement type 501 of the SQL statement is specified as either SELECT, INSERT, DELETE, or UPDATE.

As shown in FIG. 5B, if the statement type is SELECT, the table name 511, a column function 512, if any, a column name of a column to be selected 513, a predicate operator 514, and a predicate operand 515 are specified. For predicates in the WHERE clause 512, any of the selected columns that will be used for an ORDER BY on a cursor update, the columns that will be updated, and whether or not a cursor delete will occur, are specified.

As shown in FIG. 5C, if the statement type is INSERT, the specific columns 530 to be inserted or all columns, if using a subselect, any column functions and columns selected, and any predicates in a WHERE clause are specified.

As shown in FIG. 5D, if the statement type of the SQL statement is UPDATE, the column 540 to be updated, the operand 541 used to update it, and any predicates used in the WHERE clause, are specified.

As shown in FIG. 5E, if the statement type of the SQL statement is DELETE, any predicates 514 used in the WHERE clause are specified.

The next step for defining a SQL statement is inputting how the database manager will process the SQL statement. This is necessary because the costs of executing a given SQL statement depend greatly upon how the database manager will access the data which is determined by the optimizer. In fact, this is where many previous tools have failed. These previous tools simply assume that two similar SQL statements will have similar costs. But minor differences in SQL statements can change the decisions made by the optimizer and can cause major changes in the costs of executing the SQL.

Even within this step, the user inputs can be further broken down into two different steps. First the user selects the manner 636 (table space scan, index access, index only access, multiple index access, and index with RID (record identifier) list processing) in which the tables will be accessed by selecting the "Access method" button, FIG. 6C. When multiple tables are accessed, the order in which they are accessed 637 or joined must be specified, also, by selecting "Make Inner" and "Make Outer" buttons, FIG. 6C. Then, the user inputs the amount of data that will be processed as each table is accessed after selecting "Access Details" button, FIG. 6C.

More specifically, for each SQL statement, it is specified whether the SQL statement is statically or dynamically prepared. A static SQL statement is embedded within an application program and is prepared during the program preparation process before the program is executed. After it is prepared, the statement itself does not change, although values of host variables specified within the statement might change. A dynamic SQL statement is prepared and executed within an application program while the program is executing. In a dynamic SQL statement, the SQL statement source is contained in host language variables rather than being coded into the application program. The SQL statement might change several times during the application program's execution.

Figure 6A:
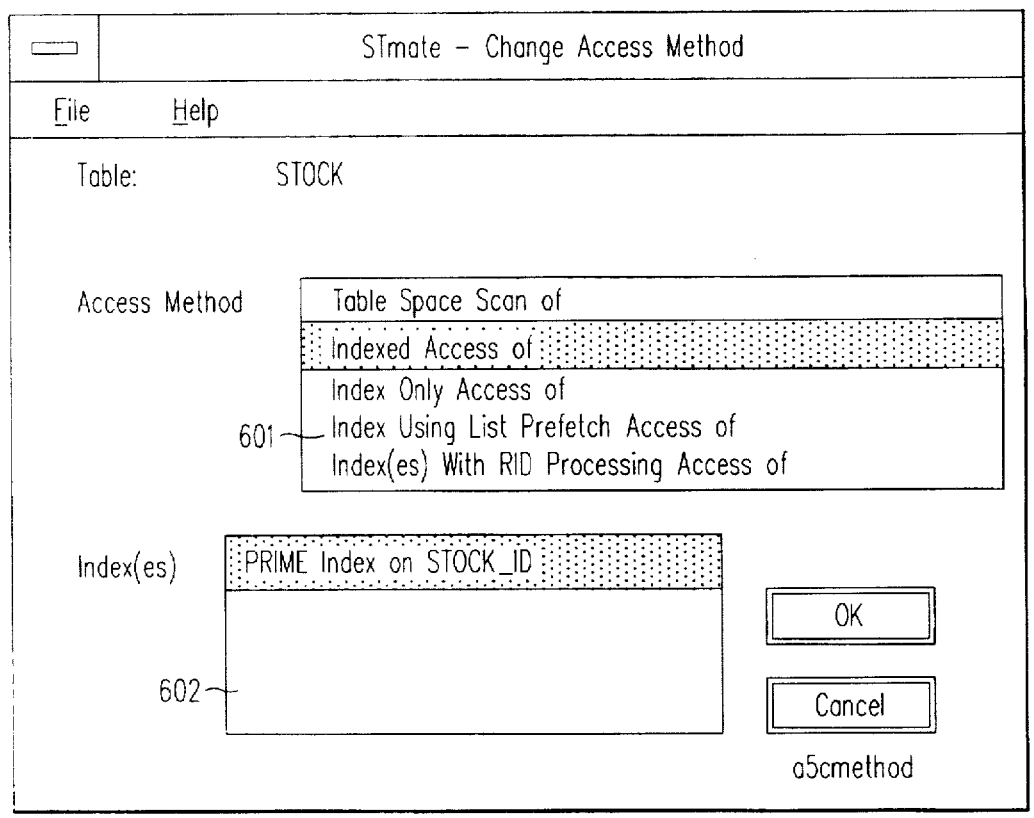
FIG. 6A shows a graphical user interface for specifying the access method for a given table referenced within a SQL statement.

As shown in FIG. 6A, for each table accessed, the access method 601 such as table space scan, indexed access, index only access, or multiple index access is specified along with the appropriate indexes 602. As shown in FIG. 6B, for each table and index accessed, the following items are specified as appropriate: 1) the number of index entries looked at 610, 2) the number qualified 611, 3) the number of data rows processed as rows 612, 4) the number of data rows processed after being broken down into columns 613, 5) the number of index pages touched 620, 6) the number of index pages read 621, 7) the number of data pages touched 622, and 8) the number of data pages read 623. When rows are summarized using a GROUP BY, the amount of summarized rows, the number of rows fetched by the application 631, FIG. 6C, the number of rows updated, the number of rows deleted, whether or not modified rows are clustered, and whether or not a sort is necessary to resolve an ORDER BY 633 or GROUP BY 632 are specified.

Figure 7:
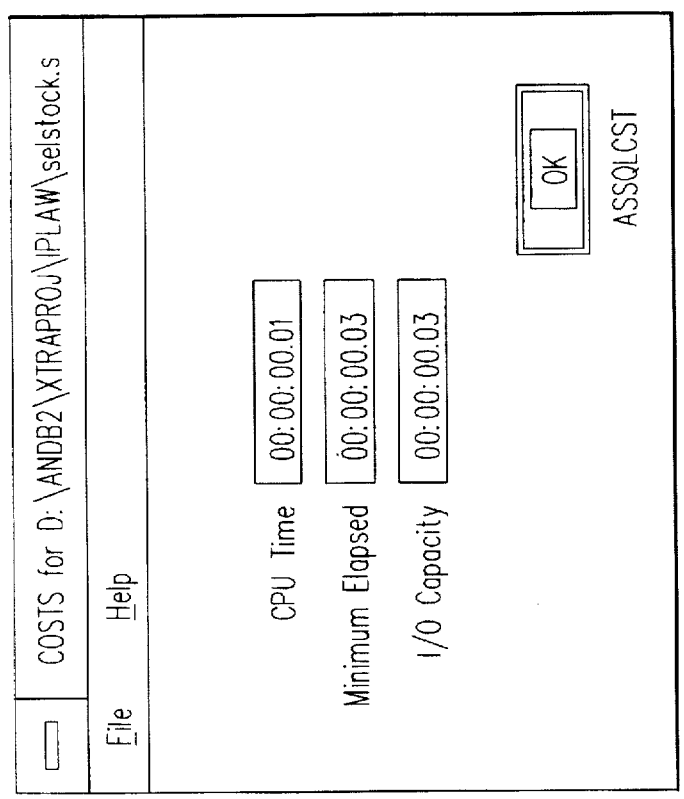
FIG. 7 shows the tool output for the execution costs for an SQL statement.

At this point, the user can obtain an estimate of the costs of executing an SQL statement as shown in FIG. 7. The user can change any inputs, and automatically get a new estimate based upon those changes. For example, the tool knows what tables must be accessed when the user specified the SQL statement. The user can quickly change the order of access, or the method the database will use to access the data, and get an estimate based upon those changes. The tool defaults these values for the user, so no inputs are required, but the estimates accuracy depends upon these defaults being correct. The costs are dependent upon more factors than are apparent from the input screens. Many of these factors, such as the number of columns processed, are figured out by the tool without additional user inputs.

To perform the estimate, the tool utilizes the user inputs for the access method to determine which formula should be called. The formulas are found in "DB2 Cost Formula", Shibamiya A., Yeung, M. Y., *IBM Technical Disclosure Bulletin*, Vol. 34, No. 12, May 1992 which is herein incorporated by reference, and included as described below. Some of the values that the formulas need have been directly inputted by the user, while others must be further derived. For example, values such as NSAN (number of times table column appears in predicates) are derived by counting the number of predicates that the user has inputted when building the SQL statement. Similarly, the value NC (number of columns retrieved, updated, or inserted) is derived by counting the number of columns that the user selected when building the SQL.

DB2 COST FORMULA

The following describes the cost formula derived from the numerous DB2 (trademark of IBM Corp.) measurements to identify major performance-sensitive variables. This cost formula is used by the DB2 V2 optimizer in selecting the most efficient access path for a given SQL call and corresponding data.

Prior to Version 2 of DB2, the CPU cost formula in the DB2 optimizer was based simply on the expected number of rows qualifying for the search arguments provided. With this method, how many rows are searched to get each qualifying row is not considered, leading to some gross errors. It also ignores performance sensitivities to the number of columns fetched, sorted, or updated, the number of host variables used, the number of search arguments which must be evaluated, etc.

One of the biggest challenges in dealing with the Relational Data Base Management Systems (RDBMS) is performance. RDBMS offers a tremendous improvement in programming user productivity. However, unlike the traditional data base management systems, in which a method to access data is predetermined at the time of data base creation, RDBMS, such as DB2, dynamically attempt to select the most efficient access path based on various statistics available at the time of execution. Such statistics can include information on tables and indexes, such as the number of records and number of pages in a table and the number of distinct index key values, the buffers available, and the format of the SQL calls. A relatively simple SQL call joining 3 tables, each of which has 3 indexes, can have thousands of different access paths possible. (An access path defines how the records in a table are to be retrieved; i.e., which tables are accessed in what sequence, what indexes are to be used for each table, etc.).

DB2 optimizer relies on the cost formula, discussed in this article, to evaluate each of the promising access path candidates to select the one considered to be the most efficient in terms of both CPU and I/O resource usage.

Notations

NDMS = number of rows scanned by Data Manager, the lower-level (first) component to process records NDMC = number of rows participating in column function evaluation NRDS = number of rows scanned by RDS, the higher-level component to process records from Data Manager NQ = number of rows qualifying NSAN = number of times table column appears in predicates NC = number of columns retrieved, updated, or inserted IO = number of I/O's, adjusted for I/O chaining if applicable NP = number of leaf and data pages scanned NG = number of rows returned to the user NIX = number of indexes to be upgraded in Insert, Delete, or Update NS = number of rows sorted NCS = number of columns and keys in sorted row RL = sort row length KL = sort key length NRG = average number of rows per group in Groupby sort NHV = number of host variables in search argument, update set list, or field-list insert T = total number of pages in table R = total number of rows in table CR = cluster ratio F = filter factor (% of rows qualifying for given search arguments)

L = number of physical leaf pages

NLEVELS = number of index levels

DML Cost Formulas

1. Pathlength formula
   a. Internal OPEN/SCAN/CLOSE

1) Base = DB2 sort+2000*NP+50*NHV+5000*IO
2) Tablespace scan =1500+NDMS*(75+60*(1+(NSAN−1)/2))+NDMC*160+NRDS*(450+35*NC)
3) Data scan via index = 2000+NDMS*(110+60*(1+(NSAN−1)/2))+NDMC*130+NRDS*(900+35*NC)
4) Data scan via RID-list
   Notations
   NDMS, NRDS, NQ to represent processes after index AND/ORing
       Note that NDMS =< FRIDS
   NDP = number of data pages accessed
   NIXA = number of indexes used in access
   NRIDS = number of RIDs extracted and sorted
   TRIDS = total number of RIDs ANDed or ORed
   FRIDS = final number of RIDs resulting from index AND/ORing
   Ksp' = sequential prefetch factor for list prefetch = $0.2+0.3*(1-NDP/T)**2$
   Index-only access to retrieve RIDs via set interface
   NIXA*(5000+2000*NPindex+5000*IO+90*NRIDS)
       Sort/merge of RIDs
   NRIDS*(120+70 if NRIDS>1000)
       AND/ORing of RIDs
   TRIDS*63
       Data page access via RIDlist
   2500*NDP+5000*IO+150*NDMS+(450+35*NC)*NRDS
   b. Select = Internal Open/Scan/Close+5000+44*NC
   c. Fetch = Internal Open/Scan/Close+5000+NG*(2100+44*NC)
   d. Update with cursor = 8000+130*NC+50*NHV+12000*NIX+5000*IO
   e. Update without cursor = Internal Open/Scan/Close+5000 +50*NHV+NQ*(3600+130*NC+12000*NIX)
   f. Insert of single row via clustering index = 7500+83*NC +50*NHV+6500*NIX+5000*IO
   g. Insert of multiple rows = Internal Open/Scan/Close Select+4000+NQ*(2900+83*NC+6500*NIX)
   h. Delete with cursor = 5000+6500*NIX+5000*IO
   i. Delete without cursor = Internal Open/Scan/Close (with NC=0)+5000+NQ(2600+6500*NIX)
   j. Multi-table query
       1) Noncorrelated IN/ALL/ANY subquery = (subquery scan) + (outer query scan) + sort +
    NRDSouter*(1800 + 135*NQ/3) fetch from temporary workfile 2) Noncorrelated EXISTS subquery = (subquery scan) + (outer query scan) +
    12000 tempory workfile create/delete +
    NQinner*600 insert into temporary workfile +
    NRDSouter*3000 fetch from temporary workfile 3) Other noncorrelated subquery, including single value ANY/ALL with range operation = outer table scan+ inner table scan
   4) Nest loop join or correlated subquery = (outer table scan)+(NQouter*inner table scan)
   5) Merge join = outer table scan+sort if needed+inner table scan+sort+NQouter*(MJR+1)*(700+35*NC) where MJR = average number of rows in inner table workfile scanned for each qualifying row in outer table
2. I/O cost formula
   One or more of the following I/O cost formula is used as appropriate for each SQL call above:
   Tablespace scan: Ksp*T Unique index with matching equal predicate:
   (NLEVELS−2) for index+1 for data
Index scan:

| | |
|---|---|
| (NLEVELS − 3) + Ksp*F*L + CR*Ksp*F*T + (1 − CR)*F*R | index I/O data I/O |

Reading data pages via list prefetch:
   Ksp*T*F*CR+Ksp'*NDP, where NDP=T(1−(1−1/T)**(R*F*(1−CR)))

DB2 Sort
1. Calculated parameters for sort
   NS = number of rows sorted
   SW = number of rows in sort workfile page
       = MIN(FLOOR(4000/(2+rowsize+keysize)), 127)
       Rowsize and keysize calculated by padding variable-length columns to maximize lengths. Add 1 to nullable column length.
   SP = number of pages required to hold all sorted rows
       = CEIL(NS/SW)
   ST = number or rows in replacement selection tree $$= MIN \left( 16000mSW * \frac{SPRMSPOL}{4000} \right)$$

where SPRMSPOL (sort pool size)=10% of total database bufferpool size with MIN of 240KB and MAX of 10MB
If NS>(2*ST), SR = number of initial runs
   = 1 + CEIL(NS/(2*ST))
SM = number of merge passes
   = average number of times each row is processed in merge
   = 1.0 if SR < 200
     1.5 if SR < 500
     2.0 if SR < 900
     2.5 if SR < 1900
     3.0 if SR < 3800
     3.5 if SR < 7600
     4.0 if SR < 15200
     4.5 else 2. Pathlength =

| | |
|---|---|
| 65000 + 1780*NS + 60*NCS*NS + NG*(900 + 35*NCS) | Base API Fetch from sort output file for orderby, groupby, union, distinct |
| + 30000 + SM*(7000 + 1600*NS) | if NS > 2ST |
| + 6000 + 790*NS | if Distinct, UNION, or non-correlated IN/ALL/ANY subquery |
| + 5000 * number of sort workfile I/O's | CPU cost for sort workfile I/O |

3. Sort workfile I/Os (assuming no buffer hit, which is a good approximation for large sort) =

| | |
|---|---|
| 0.6*SP | for first insert in API Open and last fetch in API |
| + .6*SP*SM | if NS > (2*ST); get old page and insert assume no requested buffers found in pool |
| + .3*SP | if Distinct, UNION, or noncorrelated IN/ALL/ANY | subquery

DB2 Create/Terminate Thread and Commit
1. Create/terminate thread

Pathlength = 37000 base
+ 500 * number of indexes to be accessed (from static SQL call)
+ 1000 * number of tablespaces to be accessed
(from static SQL call)

assuming no EDM pool I/Os
2. Commit

| Pathlength = 8000 | | if read only |
|---|---|---|
| 17000 + physical log I/O | if TSO update | |
| 20000 + physical log I/O | if IMS or CICS update | |

IO = 2 (TSO) or 4 (IMS or CICS) for log if update.

DB2 Dynamic Bind

Pathlength = 70000 + 5000*IO
+ 12000*(number of terms connected by AND or OR +
number of items in IN-LIST + number of UNIONs)
+ (number of tables * (10000 +
+ (5000 + (17000 if 1st column of index key))*
average number of columns in table))
+ (number of views * (50000 +
+ (5000 + (17000 if 1st column of index key))*
average number of columns in view))

IO = 3*number of tables and views

More specifically, the following describes how the parameters for the formulas specified above are generated from user inputs.

NDMS (number of rows scanned by Data Manager, the lower-level (first) component within the database management system to process records) is the value from "Result Rows/Entries 611, FIG. 6B. This value can be directly inputted by the user, or calculated based upon previous user inputs of filter factors and the number of rows in the table.

NDMC (number of rows participating in column function evaluation) is the same value as NDMS when the user has selected a column function for at least one of the columns that the SQL statement will SELECT. Otherwise the value is zero.

NRDS (number of rows scanned by relational data store (RDS), the higher-level component within the database management system that processes records returned by the Data Manager) is the value from "Rows looked at" 612 in FIG. 6B. This value can be directly inputted by the user, or calculated based upon previous user inputs of filter factors and the number of rows in the table.

NQ (number of rows qualifying) is the value from "Rows Returned" 613 in FIG. 6B. This value can be directly inputted by the user, or calculated based upon previous user inputs of filter factors and the number of rows in the table.

NSAN (number of times table column appears in predicates) is obtained by counting the number of predicates the user added to the SELECT statement in FIG. 5B.

NC (number of columns retrieved, updated, or inserted) is obtained by counting the number of columns the user added to the SELECT clause of the SELECT statement.

IO (number of I/O's, adjusted for I/O chaining if applicable) is obtained by adding the number of PAGES READ 621 from the index, to the number of PAGES READ 623 from the table that the user inputted in FIG. 6B.

NP (number of leaf and data pages scanned) is obtained by adding the number of PAGES TOUCHED 620 to the number of GETPAGES 622 that the user inputted in FIG. 6B, or that was calculated based upon earlier user inputs.

Figure 6C:
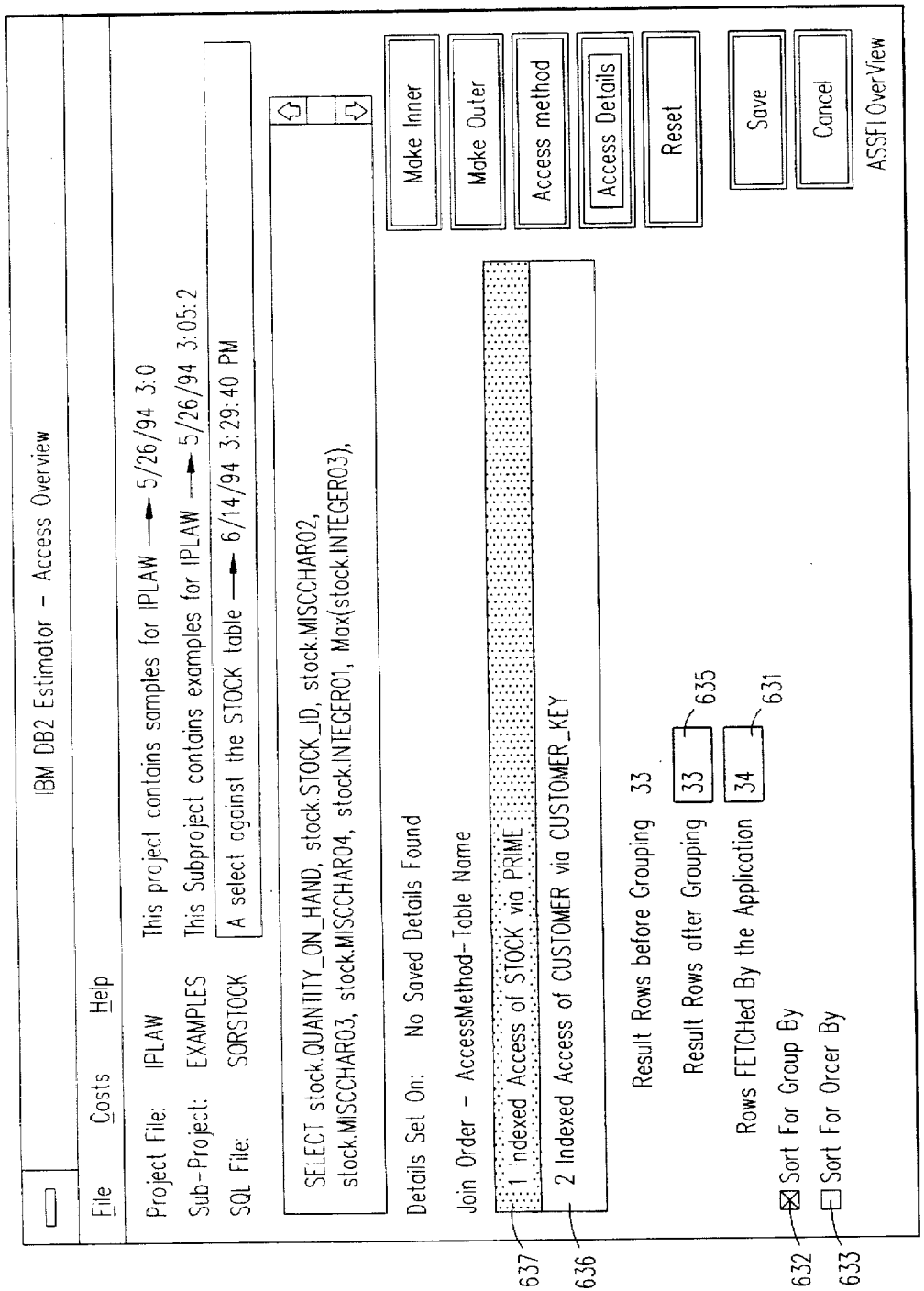
FIG. 6C shows the graphical user interface for specifying the order in which the tables are accessed in an SQL statement.

NG (number of rows returned to the user) is obtained by taking the "Result rows" input by the user if there is no GROUP BY clause, or the "Rows after Grouping" 635, FIG. 6C, inputted by the user if there is a GROUP BY clause.

NIX (number of indexes to be upgraded in INSERT, DELETE, or UPDATE) is obtained by counting the number of indexes that the user defined upon the table that was being INSERTed into, or DELETEd from; or, for a table that is being UPDATEd, it is the number of indexes defined upon the table that also contain columns that were identified as being updated by this SQL.

NS (number of rows sorted) is the same as NDMS when the user has identified that a SORT is being performed, otherwise, it is zero.

NCS (number of columns and keys in sorted row) is the number of columns in the SELECT clause plus the number of columns in the ORDER BY or GROUP BY clause.

RL (sort row length) is obtained by taking the column lengths of each column in the SELECT clause and adding them together.

KL (sort key length) is obtained by taking the column lengths of either the ORDER BY or GROUP BY columns and adding them together.

NRG (average number of rows per group in GROUPBY sort) is obtained by taking the "Result rows" inputted by the user and dividing by the number of "Rows after grouping" also inputted by the user.

NHV (number of host variables in search argument, update set list, or field-list insert) is obtained by adding together the number of host variables in predicates of the WHERE clause and adding in the number of HOST variables used in an INSERT clause.

T (total number of pages in table) is obtained by using the aforementioned formulas for DASD space calculations and the simplified table definition.

R (total number of rows in table) is inputted by the user in the simplified table definition.

CR (cluster ratio) is indirectly inputted by the user as a Cluster factor 624, FIG. 6B, where a cluster ratio of 100% is the same as a Cluster Factor of as many rows as fit per page, and a Cluster Ratio of 50% is the same as a Cluster Factor of 1 row per GETPAGE.

F (filter factor (% of rows qualifying for given search arguments)) is inputted by the user as filter factors as shown on the screen in FIG. 6B which shows an INDEX filter factor 625, FIG. 6B, and Non-Matching filter factor 626, a Stage 1 and Stage 2 filter factor.

L (number of physical leaf pages) is obtained by using the aforementioned DASD space formulas and the simplified table definition.

NLevels (number of index levels) is obtained by using the aforementioned DASD space formulas and the simplified table definition.

To determine the CPU time of a SQL statement, a pathlength formula is utilized from above according to the type of SQL statement being analyzed. For example, for an internal OPEN/SCAN/CLOSE, the Base formula (1.a.1) is utilized. To the solution to the base formula is added the solution of either the formula for the tablespace scan or the data scan via index or the data scan via RID-list (1+(2 or 3 or 4)). To get the CPU time, the pathlength is divided by the speed of the processor in mips (million of instructions per second). The tool has a list of processors and associated mips value.

To determine the I/O time of a SQL statement, the I/O cost formulas described above are utilized. However, in the preferred embodiment of this invention, the factor "Ksp" is replaced with the value "((number of pages read) 621, 623 multiplied by (milliseconds per page, for either a synchronous read or asynchronous read, as appropriate, for the I/O device specified)).

To determine the elapsed time of a SQL statement, the process described below and in copending patent application Serial Number [Internal Docket Number ST9-94-014], herein incorporated by reference, is utilized.

The estimates to this point in the process have been for a single utility, step 4, FIG. 1, or for an SQL statement, step 7, FIG. 1. To actually run an SQL statement involves more. An SQL statement must run within a transaction, batch job, or be submitted by a query manager such as IBM QMF (Query Management Facility) product. The additional costs associated with this are included by defining a transaction. In addition, within a transaction multiple SQL statements may be executed and any given SQL statement may be executed any number of times. This tool allows a user to generate a simplified description of a transaction. This description includes overhead costs such as thread create, terminate, authorization checking, and commits. It also includes selecting the SQL statement that will be executed and assigning frequencies with which it will be executed. It does not need to know anything about the sequence of execution, or the logic within the transaction.

More specifically, to estimate the cost of a transaction, step 9, FIG. 1, the tool receives input defining or modifying a simplified transaction, step 8, FIG. 1.

Figure 8:
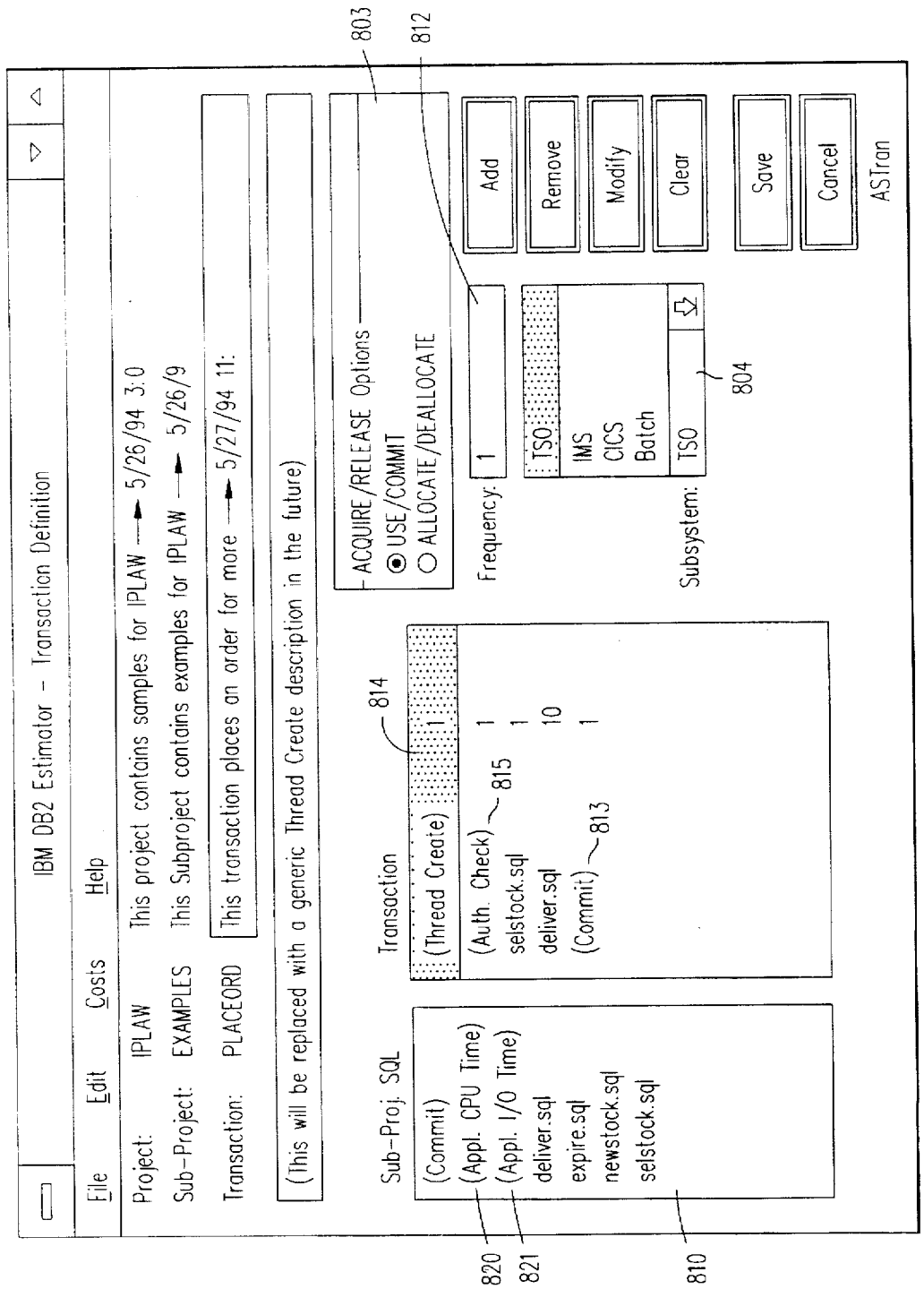
FIG. 8 shows a graphical user interface for receiving a partial and simplified definition of a transaction and overhead costs.

As shown in FIG. 8, for each SQL statement in a transaction, the user selects the aforementioned SQL 810 and the number of times that it will be executed within that transaction 812. The user selects the number of commits 813 performed by the transaction, the number of thread creates 814 performed by the transaction and the acquired/release bind option 803. The number of authorization checks 815 and whether or not execute authority was granted to the public are also specified. The user can also specify application CPU time 820 and I/O time 821 performed by the transaction outside of the database manager. The user can select the subsystem 804 that the transaction will run in, such as CICS, IMS, TSO, or batch. In specifying this simplified definition of a transaction, no programming language statements are specified.

Based upon the user inputs for this transaction, the tool will provide a estimate of the total costs, including CPU time, I/O time, and minimum elapsed time, for the transaction by taking a sum of the components of the transaction for each of the above. Again the CPU time and I/O time are determined base upon the formulas described above and the elapsed time is determined according to the process described below and in copending patent application Serial Number [Internal Docket Number ST9-94-014], herein incorporated by reference.

To estimate the system performance of an application in terms of CPU utilization, DASD utilization, and elapsed time (otherwise referred to as a capacity run), step 11, FIG. 1, the tool receives as input a simplified definition of an application, step 10, FIG. 1.

Figure 9:
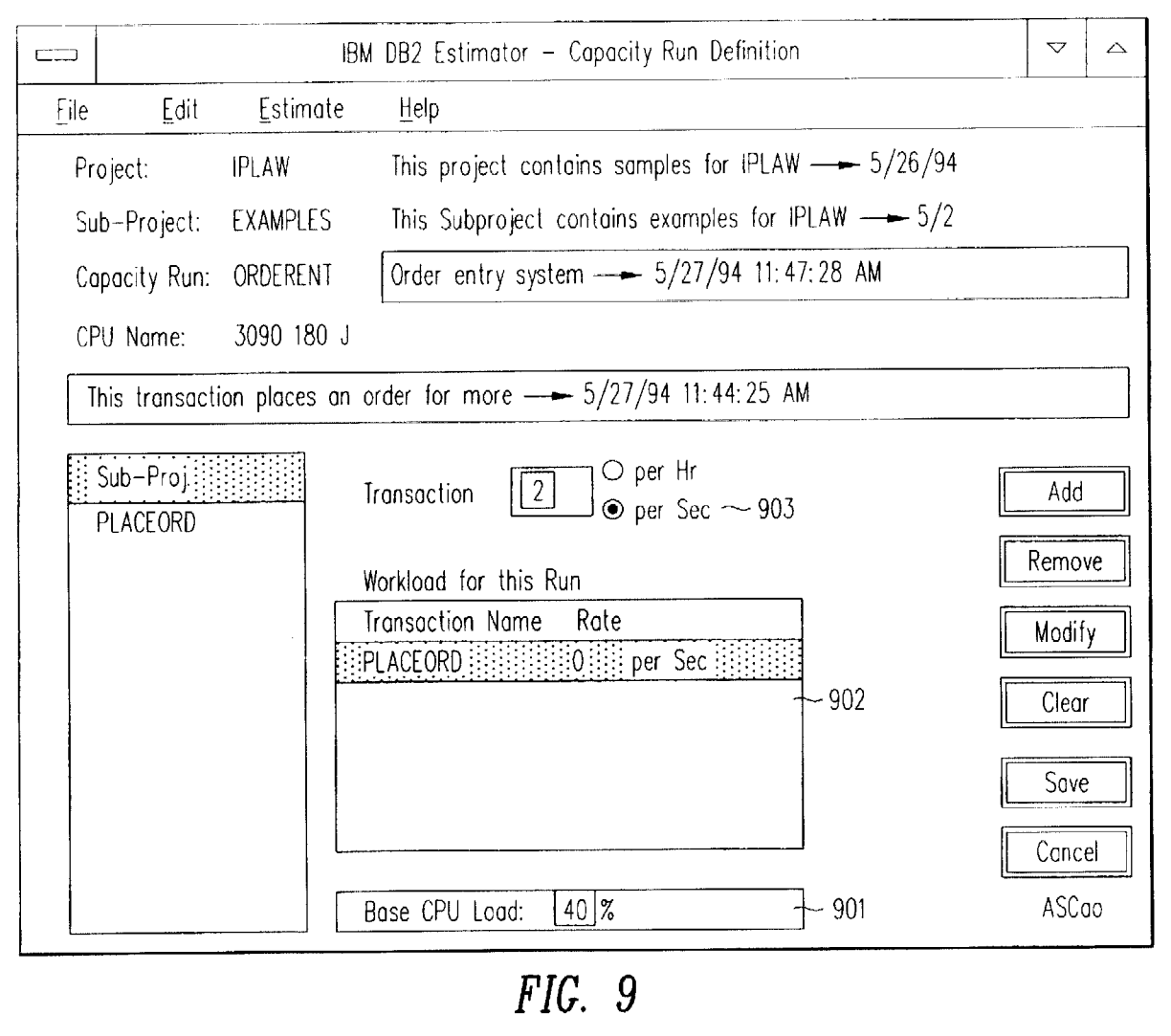

FIG. 9 shows how users would provide the necessary input for evaluating the performance of the system when at least one application is running. In defining the applications to be modeled, this tool allows the user to select at least one or more predefined partial transactions 902 that make up the application, and for each transaction selected, the user must provide a rate 903 at which that transaction has to be executed in the application. The tool also allows the user to specify the percent of CPU needed for the load that is not part of the applications being modeled, 901, i.e., the base CPU load imposed by other work on the system.

The tool takes the above input and first estimates, for each SQL statement within each transaction, the amount of CPU time, FIG. 7, and the number of pages accessed synchronously and asynchronously from each table 623 and index 621, FIG. 6B. The tool, then, constructs a queuing network model, where the CPU is modeled as M/M/m server, as described in *Computer Performance Modeling Handbook*, Lavenberg, Stephen S., Academics Press, 1983, chapter 3 (page 94), herein incorporated by reference, and the DASDs are modeled as M/M/1 servers as described in Chapter 3, page 69 of the above reference, herein incorporated by reference. The queuing network model represents the CPU and the DASDs on which the tables and the indexes accessed by the queries in the transactions modeled reside. The queuing network model is solved to compute the CPU and device (i.e., disk, DASD) utilizations and the transaction and query response time, i.e., elapsed time.

The notations in the above formulas, as found on page 94 of the above reference, are as follows:

"S" is the CPU time for a SQL statement within a transaction as computed above.

Figure 10:
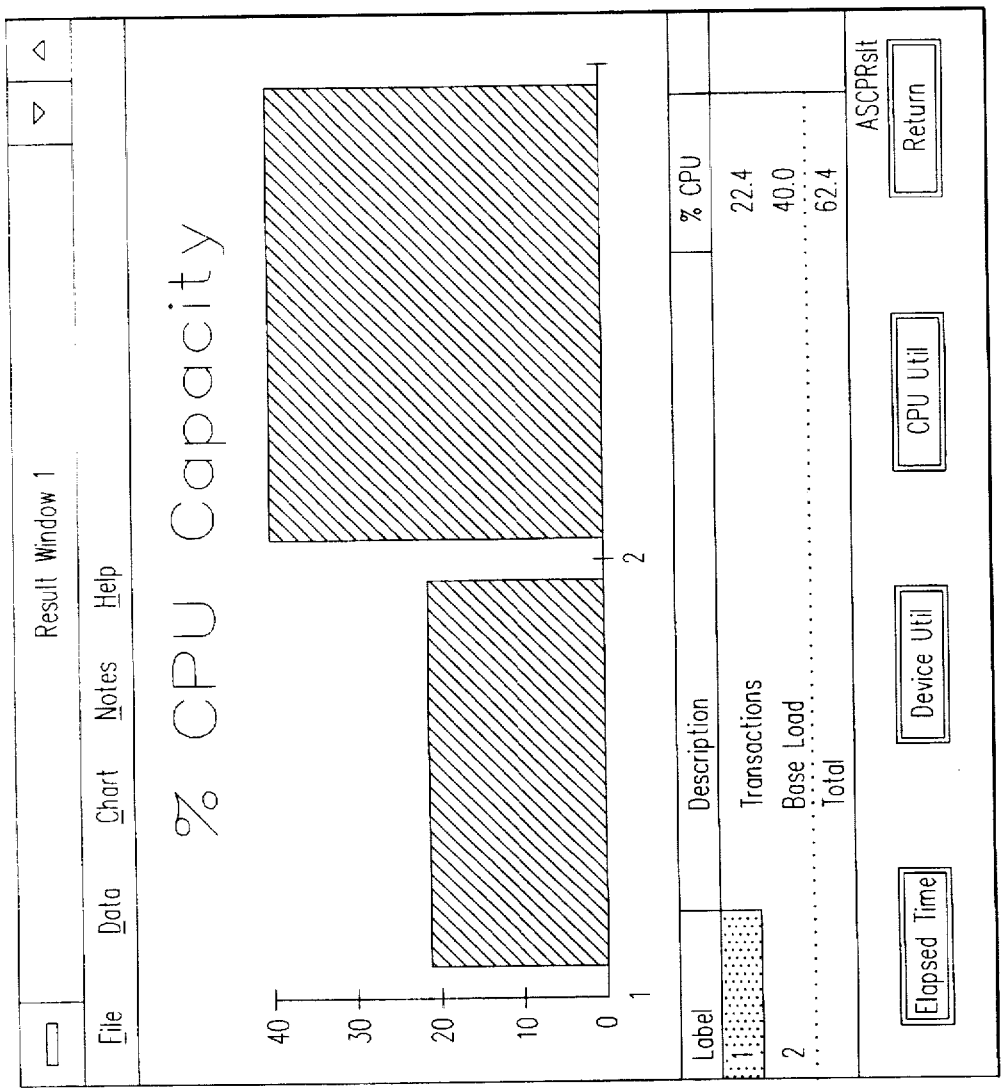
FIG. 10 shows the system performance including CPU utilization with options to display device utilizations and elapsed time.

"The Greek letter rho" equals the base CPU load 901, FIG. 9, plus the sum of (the transaction rate*the transaction CPU time) for all transactions in the capacity run 902, FIG. 9, divided by (the number of CPUs*CPU speed). This is shown as "% CPU Capacity", FIG. 10.

"m" is the number of CPUs.

"E[n]" equals the average CPU queue length in terms of number of SQL statements that are using or waiting to use the CPU.

To compute the SQL CPU response time, which is used in computing the elapsed time of the SQL statement, first, the quantity A is computed using the equation 3.135 from page 94 of the above reference, as follows:

$$\text{The sum from } i=0 \text{ to } m-1 \text{ of } [((m*rho)**i)/i!]+((m*rho)**m)/(m!(1-rho)).$$

Then E[n] is computed using equation 3.132 on page 94, as follows:

$$E[n]=(m*rho)+(rho(m*rho)m)/m!A(1-rho)2$$

Then the CPU response time for each SQL statement is computed as (E[n]*S) divided by the sum of (transaction rate*transaction CPU time) for all transactions.

The DASD response time for each SQL statement is computed as follows:

"E[s]" is the number of synchronous pages read by the SQL statement multiplied by the time to read a page synchronously plus the number of asynchronous pages read multiplied by the time to read a page asynchronously from the specified DASD. "Rho" equals the sum of (E[s]*transaction rate in which the SQL is present) for all SQL statements in all of the transactions.

The DASD response time for the SQL statement equals E[s] divided by (1−rho). This is shown as "Device Utilization" in FIG. 10.

This queuing network model captures the contention for the CPU and DASD experienced by all of the transactions.

In computing the query response time, the synchronous and asynchronous processing, i.e., the overlapping and parallel access to the CPU and devices by the database management system, are taken into account by this tool.

The transaction elapsed time and the SQL statement elapsed time and the utility elapsed time are computed as described in copending patent application [Internal Docket Number ST9-94-014] as herein incorporated by reference and as described below.

In database systems, CPU processing and I/O processing for a given SQL statement or utility is overlapped whenever possible to improve the elapsed time. CPU-I/O overlap is achieved by prefetching an index and/or data pages from I/O devices while the CPU is processing a page that was fetched earlier.

The term prefetching refers to the process of activating I/O requests and fetching the pages asynchronously before the database manager actually needs those pages. The object of prefetching is to avoid the need for the SQL statement or utility to wait for the I/O access to complete, thus reducing the elapsed time. Elapsed time is further reduced by the database system by fetching a series of pages in a single, physical I/O operation. Usually, the optimizer in the database system decides whether or not a SQL statement is likely to benefit from prefetch. For example, prefetch is always used during scans of entire data pages, often used during index only scans and usually considered for index scans if the optimizer estimates more than a fixed number of pages, e.g. eight, to be read from that index.

If a query needs pages from multiple tables and indexes, the database system can prefetch pages from several devices in parallel, thus, again, reducing the elapsed time.

The method, system and apparatus of this invention considers all of the above three features (namely, prefetching index and/or data pages, reading or writing a series of pages in one physical I/O, and reading or writing pages from multiple devices in parallel) in estimating the elapsed time for utilities, SQL statements and transactions.

Elapsed time is the time to execute a given SQL statement, transaction, application or utility by the database management system.

At the lowest level, an elapsed time estimate is made for a single SQL statement. This elapsed time estimate can be done for that SQL statement by itself, or for the SQL as part of a greater estimate. When the elapsed time estimate is for an SQL statement in isolation, the queuing times are assumed to be zero. When the elapsed time estimate is made for the SQL statement as part of a larger estimate of a total system capacity, then the estimated times will include queuing delays as estimated by a state of the art queuing model as disclosed in *Computer Performance Modeling Handbook*, "Analytical Results for Queuing Model", Chapter 3, page 94, edited by Lavenberg, Stephen S., Academy Press, 1983.

Estimating the elapsed time for an SQL requires estimating the CPU time to perform the SQL, and estimating the I/O type and time for each table and index accessed by the SQL statement. Each table and index, for which I/O is performed against, is referred to as a data set.

The type of I/O defined herein is one of three types:

Synchronous read I/O, Asynchronous read I/O, and Asynchronous Write I/O.

Synchronous read I/O is I/O performed to read the input data set which the application initiates and then waits for completion.

Asynchronous read I/O is I/O performed to read the data set which the application initiates and then performs other processing such that the I/O does not need to be waited on unless there is no other processing to be performed.

Asynchronous Write I/O is performed to write the data set. This I/O may be initiated even after the application has terminated so the application never needs to wait for this I/O to occur.

For example, a typical query might scan an entire table, then all of the I/O would be classified as asynchronous reads for that table. Another SQL statement might use an index to process a portion of the table, this could involve asynchronous I/O to the index and synchronous I/O to the table.

A more complex example might be to process a query such as inserting new rows into a table that lists employee names, from an employee table, that begin with "SMIT" and their manager names, from a department table, as follows:

INSERT INTO NUTBL (EMPNAME,MGRNAME)
  SELECT A.EMPNAME, B.MGRNAME FROM
  EMPTABLE A, DEPTTABLE B WHERE A.DEPTNO
  = B.DEPTNO and EMPNAME LIKE "SMIT*".

This would require processing the index of EMPTABLE, then the Table of EMPTABLE, then the index of DEPTTABLE, and the Table of DEPTTABLE, and then repeating this processing for the next employee. In this case, the method and apparatus of this invention calculates the total CPU time, the asynchronous read I/O to the index of EMPTABLE, the synchronous read I/O to the table EMPTABLE, the synchronous read I/O to the index of DEPTTABLE, and the synchronous read I/O to the table DEPTTABLE.

In general, for other queries, there may be both synchronous and asynchronous read I/O's for a given data set. During different processing stages of a given query, pages from the same data set can by accessed synchronously or asynchronously, depending on, for example, how many pages are required during that stage. However, in the tool of this invention, whether I/O to a given data set by a query is synchronous or asynchronous is determined by a threshold on the number of pages read from each index or table. The tool embodying this invention assumes a threshold of eight pages. If less than eight pages are read, a read is assumed to be synchronous, and if greater than eight, the read is assumed to be asynchronous.

Figure 11:
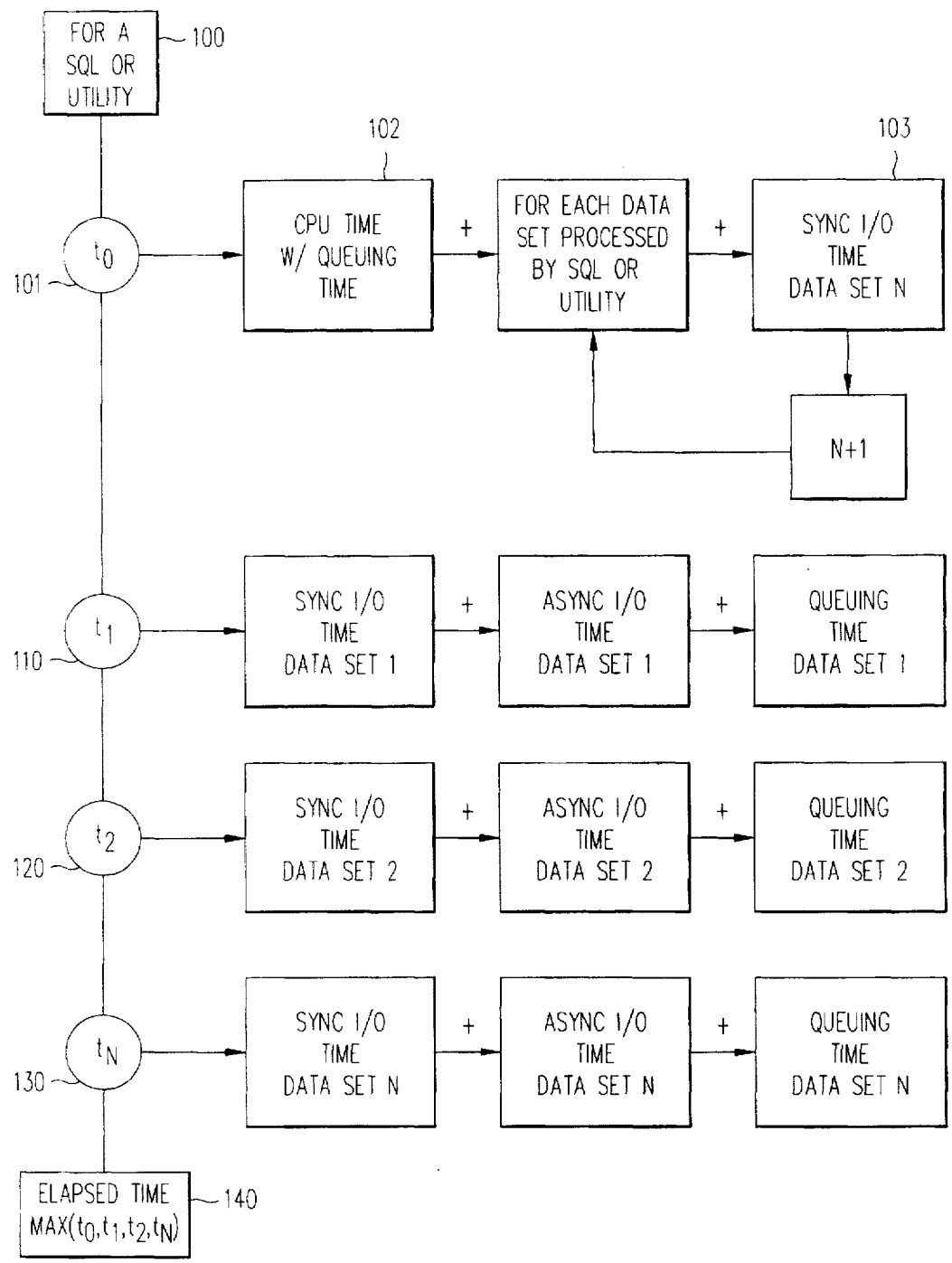
FIG. 11 shows the method of estimating elapsed time for SQL statements and utilities.

According to FIG. 11, the method and apparatus of this invention then uses these values by taking the maximum 140 of the following:

The sum of the CPU time 102 including queuing time and the sum of the synchronous Read time including queuing time of each data set 103.

The sum of the synchronous and the asynchronous read times including queuing time for the first data set 110.

The sum of the synchronous and the asynchronous read times including queuing time for the second data set 120.

The sum of the synchronous and the asynchronous read times including queuing time for the Nth data set 130.

In the above method, the CPU time for SQL statements and utilities are determined as described hereinabove.

The CPU queuing time for SQL statements and utility phases are determined as described in *Computer Performance Modeling Handbook*, Lavenberg, Stephen S., Academics Press, 1983, chapter 3 (page 94), herein incorporated by reference.

The notations in the above formulas, as found on page 94 of the above reference, are as follows:

"E[s]" is the cpu time for each utility phase or SQL statement.

"The Greek letter rho" is a fraction representing the load on the CPU which was computed previously.

"m" is the number of CPUs.

"E[r]" equals the CPU time+queuing time.

First, the quantity A is computed using the equation 3.135 from page 94, as follows:

The sum from $i=0$ to $m-1$ of $[((m*rho)**i)/i!]+((m*rho)**m)/(m!(1-rho))$.

Then the CPU queuing time is computed based on equation 3.128 on page 94, as follows:

$$(Rho*(m*rho)(m-1))/(m!A(1-rho)2)$$

Synchronous I/O read time for a data set is determined by multiplying "the number of pages read synchronously from that data set for that SQL statement" by (*) "the time to read one page synchronously". The time to read one page synchronously is determined by the type of device (DASD) on which the data set resides.

In the preferred embodiment, the time to read one page synchronously includes the sum of an average seek time, 4K bytes of data transfer time, and an average latency time for that device.

Asynchronous I/O read time for a data set is determined by multiplying "the number of pages read asynchronously from that data set for that SQL statement" multiplied by "the time to read one page asynchronously". The time to read one page asynchronously is determined by the type of device (DASD) on which the data set resides.

In the preferred embodiment, the time to read one page asynchronously is computed based on reading 32 pages in one read I/O. It includes the sum of an average seek time and 32*4K bytes of data transfer for SQL statements read I/Os. For a utility, the time to read one page asynchronously is computed based on reading 64 pages in one read I/O.

The device queuing time for each data set is computed as the number of read I/Os for the data set by the SQL statement or utility phase multiplied by rho divided by (1-rho), where rho, for each data set, is a fraction representing the load on the DASD where the data set resides.

The elapsed time, for an SQL statement in isolation when queuing times are zero, generated by the tool using the above method is shown in FIG. 7.

This model differs from the actual complexity of how DB2 processing takes place, but provides much more accurate estimates of the elapsed time than did previous models without requiring more complex inputs.

This model of elapsed time for an SQL is then used in a calculation of the elapsed time of a transaction. The elapsed time of a transaction is modeled as the sum of the elapsed times of its components. The most significant component in this definition of a transaction is one or more SQL statements. The other components are overheads for creating and terminating the transaction, performing authorization checks, and the CPU and I/O in the application program itself.

The tool also determines elapsed times for utilities using this same methodology. First, the different phases involved in the processing of each utility are identified. For example, in the REORG utility, the different phases are a) initialization b) unload (reading the table space using partitioned index or clustered index), c) reload d) sort, e) build index) and f) terminate. These phases are executed sequentially. However, within a single phase, the tables and indexes involved in that phase can be accessed synchronously or synchronously, as appropriate. Thus each phase of the utility is modeled as an SQL statement described above, and elapsed time for each phase of the utility is computed. The total elapsed time for the utility is the sum of the elapsed time for each phase of the utility, just as the SQL are added together for the total transaction cost.

Using the foregoing specifications, the invention may be implemented using standard programming techniques. The resulting programs may be stored on disk, diskettes, memory cards, ROM or any other memory device for use in a computer. For execution, the program may be copied into the RAM of the computer. One skilled in the art of computer science will easily be able to combine the software created as described with appropriate general purpose or special purpose computer hardware to create a system for executing the programs. While the preferred embodiment of the present invention has been illustrated in detail, it should be apparent that modifications and adaptations to that embodiment may occur to one skilled in the art without departing from the scope of the present invention as set forth in the following claims.

We claim:

1. A tool, for use in a computer system, for estimating execution costs of at least a portion of an application having at least one query statement for accessing a database; said tool comprising:

a user interface for receiving input from a user corresponding to a partial definition of at least one table in said database;

means for building a simplified query statement, said simplified query statement having a place-holder for each expression detail within said at least one query statement, using at least one of said at least one table; and means, based on said simplified query statement for estimating a cost of executing said at least one query statement against said database;

wherein the simplified query statement comprises only those portions of the query statement that are essential in determining the execution costs of the application accessing the database with said query statement taking into consideration a first input by the user of an estimate of a number of rows resulting in an execution of the query statement, and a second input by the user of an estimate of a number of pages touched and an estimate of a number of pages read.

* * * * *